(12) United States Patent
Natani et al.

(10) Patent No.: US 11,921,737 B2
(45) Date of Patent: Mar. 5, 2024

(54) ETL WORKFLOW RECOMMENDATION DEVICE, ETL WORKFLOW RECOMMENDATION METHOD AND ETL WORKFLOW RECOMMENDATION SYSTEM

(71) Applicant: HITACHI, LTD., Tokyo (JP)

(72) Inventors: Garima Natani, Tokyo (JP); Satoru Watanabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 191 days.

(21) Appl. No.: 17/478,983

(22) Filed: Sep. 20, 2021

(65) Prior Publication Data

US 2022/0121675 A1    Apr. 21, 2022

(30) Foreign Application Priority Data

Oct. 15, 2020    (JP) .................................. 2020-174125

(51) Int. Cl.
| | |
|---|---|
| *G06F 16/25* | (2019.01) |
| *G06F 16/245* | (2019.01) |
| *G06F 16/901* | (2019.01) |
| *G06F 21/62* | (2013.01) |
| *G06Q 10/10* | (2023.01) |
| *G06Q 10/105* | (2023.01) |

(52) U.S. Cl.
CPC .......... *G06F 16/254* (2019.01); *G06F 16/245* (2019.01); *G06F 16/9024* (2019.01); *G06F 21/6218* (2013.01); *G06Q 10/103* (2013.01); *G06Q 10/105* (2013.01)

(58) Field of Classification Search
CPC .. G06F 16/254; G06F 16/245; G06F 16/9024; G06F 21/3218; G06Q 10/103; G06Q 10/105

See application file for complete search history.

(56) References Cited

U.S. PATENT DOCUMENTS

| | | | |
|---|---|---|---|
| 9,665,662 B1 * | 5/2017 | Gautam | G06F 16/3328 |
| 10,296,524 B1 * | 5/2019 | Tung | G06F 16/248 |
| 11,481,603 B1 * | 10/2022 | Newman | G06N 3/042 |
| 11,521,077 B1 * | 12/2022 | Kapoor | G06N 20/00 |
| 2015/0256475 A1 * | 9/2015 | Suman | H04L 47/70 |
| | | | 709/226 |

(Continued)

*Primary Examiner* — Kris E Mackes
*Assistant Examiner* — Tiffany Thuy Bui
(74) *Attorney, Agent, or Firm* — Mattingly & Malur, PC

(57) ABSTRACT

Aspects relate to recommending ETL workflows for performing specific tasks based on user inputs related to a predetermined business domain while complying with policy and access conditions. Provided is an ETL workflow recommendation device including a knowledge database for storing an overall knowledge graph including an ETL knowledge graph that at least indicates ETL information about a predetermined business domain in a graph format, an input management unit that receives a user input related to the predetermined business domain and converts the user input into a graph query for searching the overall knowledge graph, an ETL recommendation unit that searches the overall knowledge graph using the graph query and generates ETL workflow candidates with respect to the user input; and an output management unit that evaluates the ETL workflow candidates and outputs an ETL workflow report indicating a recommended ETL workflow.

8 Claims, 26 Drawing Sheets

(56) References Cited

U.S. PATENT DOCUMENTS

| | | |
|---|---|---|
| 2017/0293641 A1 | 10/2017 | Denner et al. |
| 2018/0103052 A1* | 4/2018 | Choudhury ............. H04L 63/20 |
| 2019/0130007 A1* | 5/2019 | Hao ........................ G06F 17/18 |
| 2019/0213354 A1* | 7/2019 | Bhowan ................. G06N 20/00 |
| 2019/0287032 A1* | 9/2019 | Seabolt ................ G06Q 50/265 |
| 2020/0073879 A1* | 3/2020 | Grabau ................... G06F 16/93 |
| 2020/0286146 A1* | 9/2020 | Song ................... G06F 16/9024 |
| 2020/0387803 A1* | 12/2020 | Kujawinski ............... G06N 5/02 |
| 2022/0043826 A1* | 2/2022 | Zorin ..................... G06N 5/025 |
| 2022/0121675 A1* | 4/2022 | Natani ................. G06Q 10/103 |
| 2022/0122731 A1* | 4/2022 | Chen ................. G06F 16/24578 |

* cited by examiner

FIG. 8

| ID | Name | Role | Work location | Department | Field-of-expertise |
|---|---|---|---|---|---|
| 1 | X | Data Scientist | Tokyo | Data Science | ML-SVM |
| 2 | Y | Data Scientist | New York | Data Collection | ML-SVM |
| 3 | Z | Data Analyst | New York | Data Collection | Analytics |
| ... | ... | ... | ... | ... | ... |

Human Resources Database

381 — Similarity Index

1001 Work location similarity

| Location 1 | Location 2 | Similarity score |
|---|---|---|
| Tokyo | Osaka | 0.9 |
| Tokyo | New York | 0.6 |

1003 Role similarity

| Role 1 | Role 2 | Similarity score |
|---|---|---|
| Data scientist | Software engineer | 0.6 |
| Data scientist | Data analyst | 0.85 |

1002 Field-of-expertise similarity

| Role 1 | Role 2 | Similarity score |
|---|---|---|
| ML-SVM | Data analysis | 0.85 |

1004 Department similarity

| Department 1 | Department 2 | Similarity score |
|---|---|---|
| Data collection | Data science | 0.8 |

FIG. 11

| Goal | Field-of-expertise | Role |
|---|---|---|
| Improve data completeness | Business query | Business Analyst |
| Improve data quality | ML-SVM | Data Scientist |
| Improve data reliability | Security | Software development |
| Reduce tuples with Null values | ML-SVM | Data Scientist |

380 — 1101, 1102, 1103

Goal, Role, and Domain Correspondence Relationship Information

Organizational File

Order: A product having been shipped or paid for
Net sales: An amount calculated by subtracting tax and the shipping cost from the final price

404

ETL WORKFLOW RECOMMENDATION DEVICE, ETL WORKFLOW RECOMMENDATION METHOD AND ETL WORKFLOW RECOMMENDATION SYSTEM

CROSS-REFERENCE TO RELATED APPLICATIONS

The present application claims priority to Japanese Patent Application No. 2020-174125, filed Oct. 15, 2020. The contents of this application are incorporated herein by reference in their entirety.

BACKGROUND OF THE INVENTION

The present disclosure relates to an ETL workflow recommendation device, an ETL workflow recommendation method, and an ETL workflow recommendation system.

SUMMARY OF THE INVENTION

In recent years, in order to effectively utilize information that is located both inside and outside of a company and make it useful for management, it has become necessary for enterprises to aggregate and accumulate necessary information in one place. As the number of types of data sources to be used as information sources increases, the programs for accumulating this information require specialized knowledge to be programmed according to each data source, and a large amount of development man-hours becomes necessary.

So-called Extract, Transform, Load (ETL) is known as a means of aggregating scattered information, converting it into a format that meets predetermined requirements, and developing it as needed. ETL refers to the process of collecting data from an unlimited number of sources, combining the data together, and aggregating the data into a single repository. By using ETL, the advanced expertise required for each data source can be absorbed on the tool side, and the number of development man hours can be greatly reduced.

Conventionally, proposals have been made to facilitate the management of information using ETL tools.

For example, U.S. Patent Application Publication No. 2017/0293641 (Patent Document 1) discloses means for "a system, method and computer program product for a data warehouse model validation system, said data warehouse model validation system having an ETL model and a corresponding data warehouse model, said data ETL system comprising: an element group locator for locating an element group across the ETL model and the data warehouse model, whereby the element group comprises ETL elements and related data warehouse elements; an inconsistency determiner for determining inconsistencies between the ETL elements and data warehouse elements, whereby one or more elements are missing from the data warehouse model or one or more elements in the data warehouse model do not correspond to expected elements or features of elements; and an inconsistency recorder for recording any located missing elements or unexpected elements from the located element group."

Patent Document 1 relates to a means for determining inconsistencies between an ETL element and a data warehouse element. According to Patent Document 1, for example, a data warehouse constructed by ETL processing can be verified to ensure data accuracy and consistency.

However, Patent Document 1 is focused on improving the consistency of data, and recommending an ETL workflow for executing a predetermined task based on a request from a user is not considered.

Accordingly, it is an object of the present disclosure to provide a means for recommending an ETL workflow for performing a specific task based on a user input related to a predetermined business domain, thereby increasing the efficiency of processes such as data preparation, data cleaning, and data analysis performed in companies, and promoting effective use of data.

In order to solve the above problems, one representative ETL workflow recommendation device according to the present disclosure includes a knowledge database for storing an overall knowledge graph including an ETL knowledge graph that at least indicates ETL information about a predetermined business domain in a graph format, an input management unit that receives a user input related to the predetermined business domain and converts the user input into a graph query for searching the overall knowledge graph, an ETL recommendation unit that searches the overall knowledge graph using the graph query and generates ETL workflow candidates with respect to the user input, and an output management unit that evaluates the ETL workflow candidates and outputs an ETL workflow report indicating a recommended ETL workflow.

According to the present disclosure, it is possible to provide a means for recommending an ETL workflow for performing a specific task based on a user input related to a predetermined business domain, thereby increasing the efficiency of processes such as data preparation, data cleaning, and data analysis performed in companies, and promoting effective use of data.

Other problems, configurations and effects other than those described above will be made clear by the following description of embodiments for carrying out the invention.

BRIEF DESCRIPTION OF THE DRAWINGS

FIG. 8 is a diagram illustrating an example of a human resources database according to the embodiments of the present disclosure.

FIG. 10 is a diagram illustrating an example of a similarity index according to the embodiments of the present disclosure.

FIG. 11 is a diagram illustrating an example of correspondence relationship information of a goal, a domain, and a role according to the embodiments of the present disclosure.

DETAILED DESCRIPTION

Figure 1:
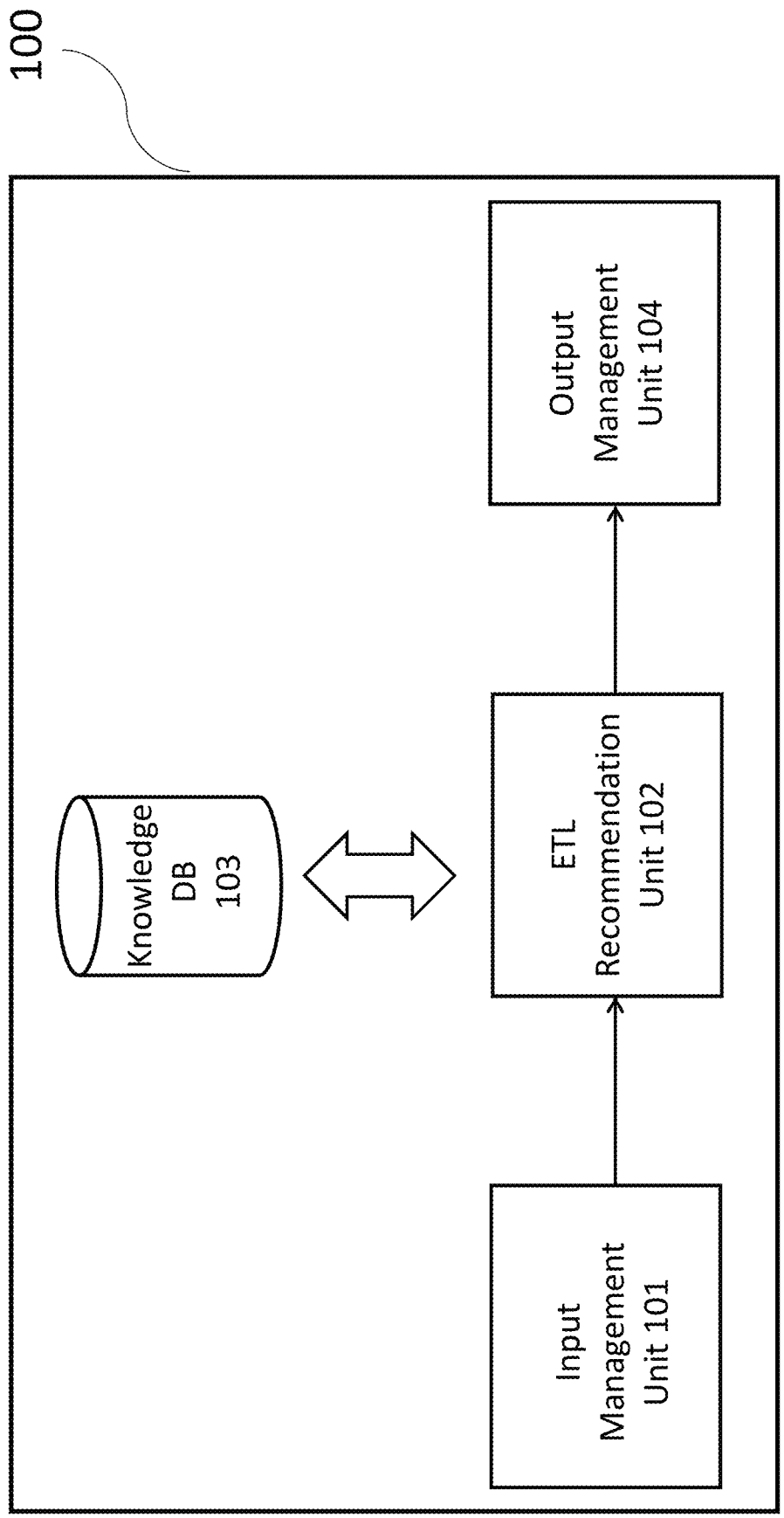
FIG. 1 is a diagram illustrating an example of a logical configuration of an ETL workflow recommendation device according to the embodiments of the present disclosure.

Hereinafter, embodiments of the present disclosure will be described with reference to the drawings. It should be noted that the present disclosure is not limited by these embodiments. Further, in the description of the drawings, the same parts are indicated by the same reference numerals.

It is of importance for companies to aggregate information about various businesses, and to quickly access necessary information. In recent years, however, regulations on the storage, use, and sharing of data, such as Data Localization Policy and General Data Protection Regulations, have been enforced as measures to improve the security and safety of data worldwide. As a result, access to data may be restricted, and obtaining, sharing, or providing required data when necessary while complying with the policy and access conditions imposed on the particular data may be difficult.

Accordingly, the present disclosure relates to recommending, based on a user input related to a predetermined business domain, an ETL workflow for executing the data processing (extraction, transformation, loading) necessary to perform a predetermined task while complying with policy and access conditions.

When the ETL workflow recommendation device according to the present disclosure receives a user input including at least one of a user query composed of natural language, a predetermined business term, a desired ETL workflow goal, or a reference file, the ETL workflow recommendation device converts the user input into a graph query for searching an overall knowledge graph that includes ETL information, human resources information, organizational information, and file information.

Subsequently, by searching the overall knowledge graph using the graph query, it is possible to determine appropriate ETL workflow candidates with respect to the user input. In addition, the determined ETL workflow can be evaluated based on criteria such as security, data quality, and cost efficiency, and those that do not meet the predetermined policy conditions and access conditions can be excluded from the candidates, so that an ETL workflow suitable for the task of the user can be recommended.

In this way, it is possible to increase the efficiency of processes such as data preparation, data cleaning, and data analysis performed in companies, and to promote effective use of data.

First, with reference to FIG. 1, the logical configuration of the ETL workflow recommendation device according to the embodiments of the present disclosure will be described.

FIG. 1 is a diagram illustrating an example of a logical configuration of the ETL workflow recommendation device 100 according to the embodiments of the present disclosure. As illustrated in FIG. 1, the ETL workflow recommendation device 100 according to the embodiments of the present disclosure primarily includes an input management unit 101, an ETL recommendation unit 102, a knowledge database (DB) 103, and an output management unit 104.

The knowledge database 103 is a database for storing an overall knowledge graph including an ETL knowledge graph constructed using at least ETL information for a predetermined business domain. Here, the business domain is a field related to a business, and includes any field, such as insurance, real estate, IT, or energy.

The input management unit 101 is a functional unit for receiving a user input related to the business domain and converting the user input into a graph query for searching the overall knowledge graph stored in the knowledge database 103.

The ETL recommendation unit 102 is a functional unit for searching the overall knowledge graph stored in the knowledge database 103 using the graph query obtained from the input management unit 101, and generating ETL workflow candidates with respect to the user input.

The output management unit 104 is a functional unit for evaluating the ETL workflow candidates generated by the ETL recommendation unit 102, and outputting an ETL workflow report indicating a recommended ETL workflow.

It should be noted that details of these functional units will be described later.

Next, with reference to FIG. 2, the logical configuration of the input management unit in the ETL workflow recommendation device according to the embodiments of the present disclosure will be described.

Figure 2:
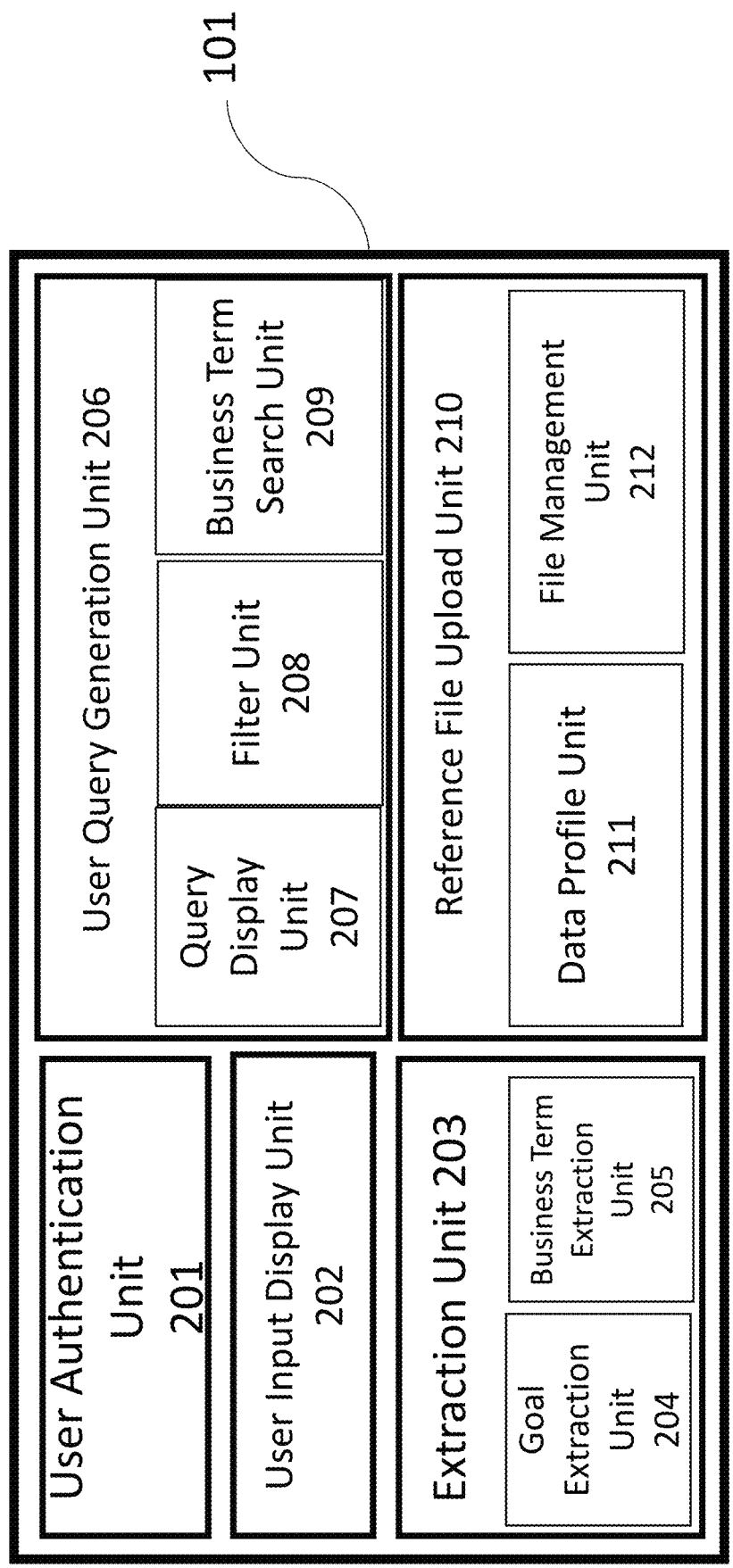
FIG. 2 is a diagram illustrating an example of the logical configuration of an input management unit in the ETL workflow recommendation device according to the embodiments of the present disclosure.

FIG. 2 is a diagram illustrating an example of the logical configuration of the input management unit 101 in the ETL workflow recommendation device 100 according to the embodiments of the present disclosure. As illustrated in FIG. 2, the input management unit 101 in the ETL workflow recommendation device 100 according to the embodiments of the present disclosure primarily includes a user authentication unit 201, a user input display unit 202, an extraction unit 203, a user query generation unit 206, and a reference file upload unit 210.

The user authentication unit 201 is a functional unit for managing an authentication process of a user of the ETL workflow recommendation device 100 according to the embodiments of the present disclosure. The user authentication unit 201 verifies authentication information such as an email address and a password input by the user to an authentication screen (see the authentication screen 2100 illustrated in FIG. 21) to be described later, and controls access to the functions of the ETL workflow recommendation device 100, such that access can be granted only to registered users.

The user input display unit 202 is a display unit for confirming information (authentication information such as an email address and a password, a user query, or the like) input by the user. The user input display unit 202 may be, for example, a screen displayed on an external display connected to the ETL workflow recommendation device 100. The user input display unit 202 is updated in real time in response to input or modifications by the user.

The extraction unit 203 is a functional unit for extracting the information that will be used for determining a recommended ETL workflow from the input information input by the user. As illustrated in FIG. 2, the extraction unit 203 includes a goal extraction unit 204 and a business term extraction unit 205.

The goal extraction unit 204 is a functional unit for extracting an ETL goal (for example, a goal designated by a user) related to an ETL file (for example, the ETL file 401 illustrated in FIG. 4) stored in advance in the ETL workflow recommendation device 100. For example, in the case that ETL goals such as "improve data reliability" or "improve processing performance" are stored in the ETL file stored in advance in the ETL workflow recommendation device 100, the goal extraction unit 204 extracts the information of these ETL goals and displays the information on the user input display unit 202 (see the user input screen 2200 illustrated in FIG. 22).

The business term extraction unit 205 is a functional unit for extracting the information of business terms and definitions specific to a particular organization in an organizational file (for example, the organizational file 404 illustrated in FIG. 4) stored in advance in the ETL workflow recommendation device 100. For example, in a case where specific definitions are defined for business terms of "order" and "net sales" in an organizational file stored in advance in the ETL workflow recommendation device 100, the business term extraction unit 205 extracts these business terms and their definitions, and displays them on the user input display unit 202.

The user query generation unit 206 is a functional unit for generating a user query. Here, a user query refers to a natural language question that is created by a user and relates to a predetermined business domain. The user query may be, for example, a request for obtaining information necessary for a predetermined task. As an example, the user query here may include "What are the orders and net sales over the past three months?" As will be discussed below, this user query is used to determine a recommended ETL workflow.

In addition, as illustrated in FIG. 2, the user query generation unit 206 includes a query display unit 207, a filter unit 208, and a business term search unit 209.

The query display unit 207 is a display unit for displaying a user query created by a user, and may be, for example, a screen displayed on an external display connected to the ETL workflow recommendation device 100.

The filter unit 208 is a functional unit for setting, when creating the user query, a filter for narrowing down the results of the user query. For example, the filter unit 208 may include a temporal filter for specifying a predetermined period, a group filter for classifying results into individual groups, or the like.

The business term search unit 209 is a functional unit for searching for metadata such as tags that correspond to business terms in the user query created by the user and attaching the metadata to the user query. By searching for tags corresponding to business terms and attaching them to the user query, more favorable results can be obtained for the user query.

The reference file upload unit 210 is a functional unit for uploading a reference file together with the user query. The reference file here is a file used when determining a recommended ETL workflow, and may be uploaded instead of a user query or uploaded together with a user query. As an example, the reference file may be, for example, a file of a format similar to that of a file output by the ETL workflow desired by the user, or a file having the same contents as the data content output by the ETL workflow desired by the user.

In addition, as illustrated in FIG. 2, the reference file upload unit 210 includes a data profile unit 211 and a file management unit 212.

The data profile unit 211 is a functional unit for acquiring a data profile related to a reference file or a file stored in the ETL workflow recommendation device 100 (for example, a file having high similarity to a reference file uploaded by a user). For example, the data profile unit 211 may acquire, as a metadata profile for the reference file uploaded by the user, information such as author information, creation date and time information, usage frequency information, usage form information, evaluation information, statistical information, distribution information, and a relationship with other files (compliance with predetermined business rules).

The file management unit 212 is a functional unit for confirming and managing the information of the data profile acquired by the data profile unit 211. For example, the user may view, save, or edit the data profile acquired by the data profile unit 211 via the file management unit 212.

By means of the input management unit 101 configured as described above, various kinds of information used in generating recommended ETL workflows can be acquired.

Next, with reference to FIG. 3, the logical configuration of the ETL recommendation unit in the ETL workflow recommendation device according to the embodiments of the present disclosure will be described.

Figure 3:
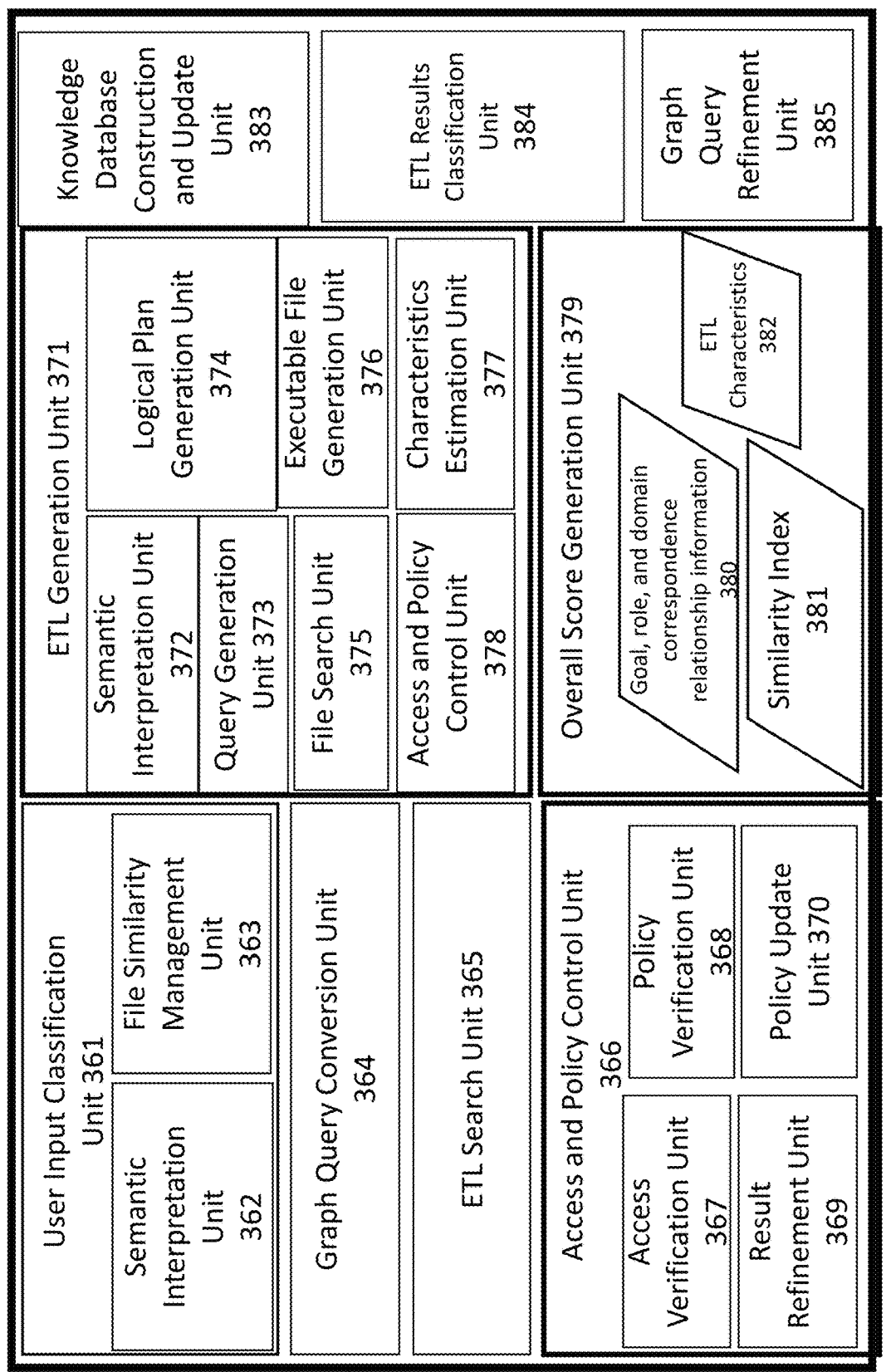
FIG. 3 is a diagram illustrating an example of the logical configuration of an ETL recommendation unit in the ETL workflow recommendation device according to the embodiments of the present disclosure.

FIG. 3 is a diagram illustrating an example of the logical configuration of the ETL recommendation unit 102 in the ETL workflow recommendation device 100 according to the embodiments of the present disclosure.

As illustrated in FIG. 3, the ETL recommendation unit 102 in the ETL workflow recommendation device 100 according to the embodiments of the present disclosure primarily includes a user input classification unit 361, a graph query conversion unit 364, an ETL search unit 365, an access and policy control unit 366, an ETL generation unit 371, an overall score generation unit 379, a knowledge database construction and update unit 383, an ETL result classification unit 384, and a graph query refinement unit 385.

The user input classification unit 361 is a functional unit for classifying user inputs input via the input management unit 101 described above and for executing appropriate processing according to the type of the information. For example, the user input classification unit 361 can determine whether the user input that was input via the input management unit 101 is a user query in natural language or a reference file. In the case that the user input that was input through the input management unit 101 is a user query composed of natural language, the user input classification unit 361 executes processing by the semantic interpretation unit 362. On the other hand, in the case that the user input that was input through the input management unit 101 is a reference file, the user input classification unit 361 executes the processing performed by the file similarity management unit 363.

The semantic interpretation unit 362 is a functional unit for performing natural language processing on the user query and determining the meaning of the user query in the case that the user input that was input via the input management unit 101 is a user query. Here, the semantic interpretation unit 362 may use an existing natural language processing means, and is not particularly limited as long as it can accurately determine the meaning of the user query. As an example, in the case of a user query of "What are the orders and net sales over the past three months?", the semantic interpretation unit 362 may extract business terms such as "order" and "net sales," and determine the meaning of the extracted business terms in the organization based on the organizational knowledge graph to be described later, thereby identifying the information requested by the user query.

The file similarity management unit 363 is a functional unit for selecting, from among the files stored in advance in the ETL workflow recommendation device 100, a file that satisfies a predetermined similarity criterion with respect to the uploaded reference file in the case that the user input that was input via the input management unit 101 is a reference file. Here, in order to calculate the similarity between the uploaded reference file and the files stored in advance in the ETL workflow recommendation device 100, the file similarity management unit 363 may compare the data profiles between the uploaded reference file and the files stored in advance in the ETL workflow recommendation device 100.

As an example, the file similarity management unit 363 may compare data profiles such as business terms, statistical information, author information, creation date and time information, and the like for each file, and may set a higher similarity level if the data profiles match, and set a lower similarity level if the data profiles do not match.

The graph query conversion unit 364 is a functional unit that converts the user input that was input through the input management unit 101 into a graph query for searching the overall knowledge graph to be described later. As an example, if the user query includes a particular business term, the graph query conversion unit 364 may convert a user query into a graph query for searching for an ETL workflow that includes the business term.

The ETL search unit 365 is a functional unit for acquiring ETL workflow candidates with respect to the graph query by searching the overall knowledge graph (for example, the overall knowledge graph 450 illustrated in FIG. 4) to be described later using the graph query converted by the graph query conversion unit 364.

The access and policy control unit 366 is a functional unit for determining whether or not the ETL workflow candidates acquired by the ETL search unit 365 satisfy predetermined access conditions and policy conditions. In the case that an ETL workflow candidate acquired by the ETL search unit 365 does not satisfy any one of the predetermined access conditions and policy conditions, the access and policy control unit 366 deletes that ETL workflow from the ETL workflow candidates.

As illustrated in FIG. 3, the access and policy control unit 366 includes an access verification unit 367, a policy verification unit 368, a result refinement unit 369, and a policy update unit 370.

The access verification unit 367 is a functional unit for verifying, as an access condition of the ETL workflow, whether or not the user of the ETL workflow recommendation device 100 is authorized to access the ETL workflow acquired by the ETL search unit 365. The verification may be performed based on, for example, authentication information input by the user.

The policy verification unit 368 is a functional unit for verifying, as a policy condition of the ETL workflow, whether or not the ETL workflow acquired by the ETL search unit 365 satisfies a predetermined policy (a localization policy, a security policy, and the like).

The result refinement unit 369 is a functional unit for deleting, from the ETL workflow candidates, an ETL workflow that does not satisfy any one of the above-described access conditions or policy conditions. For example, in the case that the user is not authorized to access the ETL workflow acquired by the ETL search unit 365, the result refinement unit 369 deletes the ETL workflow from the ETL workflow candidates. In addition, in the case that the ETL workflow acquired by the ETL search unit 365 does not satisfy a predetermined policy condition, the result refinement unit 369 deletes the ETL workflow from the ETL workflow candidates.

The policy update unit 370 is a functional unit for updating the access conditions or the policy conditions described above. For example, the policy update unit 370 may monitor a database that specifies the access conditions and policy conditions, and when there is a modification to the access conditions or policy conditions in the database, the policy update unit 370 may update the access conditions and policy conditions used by the access and policy control unit 366 in accordance with this modification. Alternatively, the policy update unit 370 may update the access conditions and policy conditions in accordance with a direct modification instruction from the user.

The ETL generation unit 371 is a functional unit for generating a new ETL workflow in the case that an ETL workflow candidate with respect to the graph query is not found as a result of the search performed by the ETL search unit 365. As illustrated in FIG. 3, the ETL generation unit 371 includes a semantic interpretation unit 372, a query generation unit 373, a logical plan generation unit 374, a file search unit 375, an executable file generation unit 376, a characteristics estimation unit 377, and an access and policy control unit 378.

The semantic interpretation unit 372 is a functional unit that performs natural language processing with respect to the user query input via the input management unit 101 and determines the meaning of the user query. Since the semantic interpretation unit 372 is substantially the same as the semantic interpretation unit 362 described above, the description thereof is omitted here.

The query generation unit 373 generates a query for searching the file knowledge graph (for example, the file knowledge graph 411 illustrated in FIG. 4) to be described later based on the result of processing by the semantic interpretation unit 372.

The file search unit 375 acquires a file related to the query by searching the file knowledge graph (for example, the file knowledge graph 411 illustrated in FIG. 4) using the query generated by the query generation unit 373.

The access and policy control unit 378 is a functional unit for determining whether or not a file acquired by the file search unit 375 satisfies predetermined access conditions and policy conditions. Since the access and policy control unit 378 is substantially the same as the access and policy control unit 366 described above, the description thereof is omitted here.

The logical plan generation unit 374 is a functional unit for generating, as a new ETL workflow, a logical plan formed by concatenating a plurality of processes based on the file acquired by the file search unit 375.

The executable file generation unit 376 is a functional unit for generating an executable file (an .exe file or the like) for executing the various processes of the logical plan generated by the logical plan generation unit 374.

The feature estimation unit 377 is a functional unit for estimating various parameters such as processing performance and data quality of the new ETL workflow generated by the logical plan generation unit 374.

As an example, in the case there is a query of "What are the orders and net sales over the past three months?", the semantic interpretation unit 372 analyzes the user query to determine that the output of the information of "orders" and "net sales" in the period of "three months" is required, and then the query generation unit 373 generates a query for searching for a file including the information of "orders" and "net sales".

Subsequently, the file search unit 375 acquires "Order_detail_feb.csv", "Order_detail_jan.csv", "Sales data.csv", and "Order status.csv" as search results, and excludes files that do not correspond to the period of the "last 3 months". The access policy control unit 379 verifies whether or not the acquired files satisfy the predetermined access conditions and policy conditions. In the case that both the access conditions and the policy conditions are satisfied, the logical plan generation unit 374 generates a logical plan based on these files, and then the executable file generation unit 376 generates an executable file.

The overall score generation unit 379 is a functional unit for evaluating an ETL workflow and generating an overall score as a measure that quantitatively indicates the appropriateness of the ETL workflow with respect to the user input. The overall score generation unit 379 may generate an overall score based on the goal, role, and domain correspondence relationship information 380, the similarity index 381, and the ETL characteristics 382 estimated by the characteristics estimation unit 377. In addition to these pieces of information, the overall score generation unit 379 may consider data quality, performance, cost efficiency, security, usability, applicability, and the like.

In The knowledge database construction and update unit 383 is a functional unit for constructing and updating the knowledge database 103 illustrated in FIG. 1, for example. In order to construct the knowledge database 103, the knowledge database construction and update unit 383 may include an ETL information management unit that extracts ETL information from ETL files and generates an ETL knowledge graph, a human resources information management unit that extracts human resources information from a human resources database and generates a human resources knowledge graph, a file information management unit that extracts file information from data catalog files and generates a file knowledge graph, an organizational information management unit that extracts organizational information from organizational files and generates an organizational knowledge graph, and a knowledge aggregation unit that aggregates these knowledge graphs (see FIG. 4).

Further, the knowledge database construction and update unit 383 may update the knowledge database (that is, the overall knowledge graph included in the knowledge database) based on additional information each time new data (ETL files, human resources database, data catalog files, organizational files) is added to the ETL workflow recommendation device 100, for example.

The ETL results classification unit 384 is a functional unit for classifying, based on the overall score, the ETL workflow candidates evaluated by the overall score generation unit 379 (for example, arranging the ETL workflow candidates in descending order of overall score).

The graph query refinement unit 385 is a functional unit for refining a graph query (based on a user input or the like) in the case that an ETL workflow is not found as a result of the search performed by the ETL search unit 365, for example.

By means of the ETL recommendation unit 102 configured as described above, it is possible to recommend ETL workflows for executing specific tasks based on a user input related to a predetermined business domain.

Next, with reference to FIG. 4, a means for constructing the overall knowledge graph stored in the knowledge database according to the embodiments of the present disclosure will be described.

Figure 4:
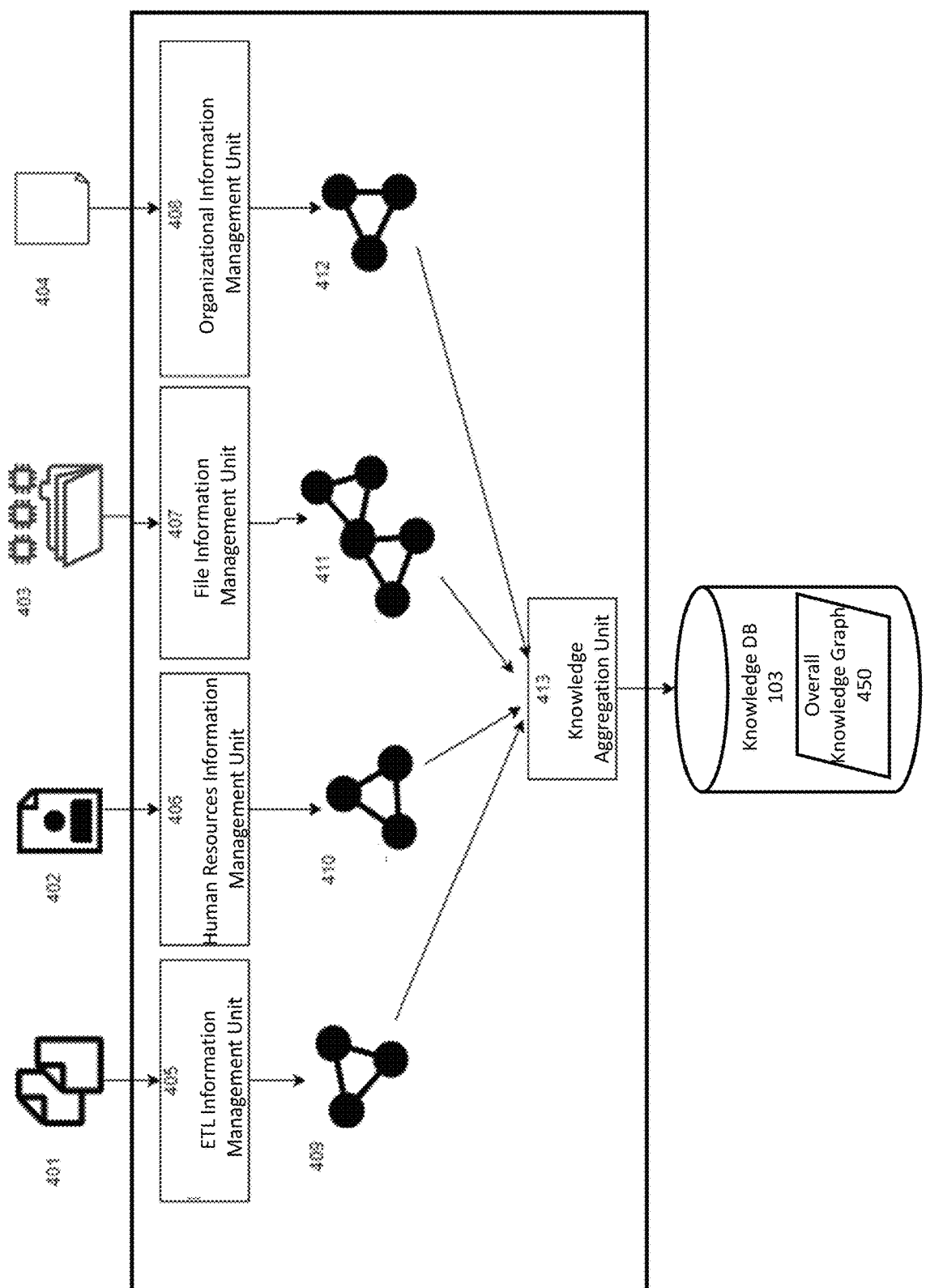
FIG. 4 is a diagram illustrating an example of a means for constructing an overall knowledge graph stored in a knowledge database according to the embodiments of the present disclosure.

FIG. 4 is a diagram illustrating an example of a means for constructing the overall knowledge graph 450 stored in the knowledge database 103 according to the embodiments of the present disclosure.

As illustrated in FIG. 4, the overall knowledge graph 450 stored in the knowledge database 103 according to the embodiments of the present disclosure is a graph-format data structure constructed by aggregating an ETL knowledge graph 409 generated from the ETL information extracted from the ETL file 401, a human resources knowledge graph 410 generated from the human resources information extracted from the human resources database 402, a file knowledge graph 411 generated from the file information extracted from the data catalog file 403, and an organizational knowledge graph 412 generated from the organizational information extracted from the organizational file 404, and is used to determine a recommended ETL workflow with respect to a user input from the user.

By expressing ETL information, human resources information, file information, organizational information, and the like in a graph format such as the overall knowledge graph, it is possible to improve the process of acquiring necessary information in comparison with so-called relational databases in which, for example, complex query creation or the joining of a plurality of tables is required.

The ETL information management unit 405 extracts ETL workflow step information, author information, metadata, and the like as ETL information from an ETL file 401 stored in advance in the ETL workflow recommendation device 100, and generates the ETL knowledge graph 409 from the extracted information. As an example, in the case of an ETL file 401 that includes an input step, a data conversion step, and an output step, the ETL information management unit 405 may generate the ETL knowledge graph 409 after extracting, together with these steps, author information, metadata, data quality (data accuracy, data completeness, data freshness, data consistency, data interpretability, and the like), performance, cost efficiency, security, data usability, data availability, data manageability, ETL goals, and the like of the ETL file 401.

It should be noted that an example of the ETL knowledge graph 409 will be described with reference to FIG. 7.

The human resources information management unit 406 extracts, from the human resources database 402 stored in advance in the ETL workflow recommendation device 100, identification information, role information, work location information, department information, field-of-expertise information, and the like for a human resource as human resources information, and generates the human resources knowledge graph 410 from the extracted information. As examples, the human resources information management unit 406 may generate the human resources knowledge graph 410 from human resources information such as IDs or names for identifying particular human resources, roles of data scientist or data analysis, work locations for human resources such as Tokyo or New York, departments such as data science or data collection, and fields-of-expertise such as ML-SVM or Analytics.

It should be noted that an example of the human resources knowledge graph 410 will be described with reference to FIG. 9.

The file information management unit 407 extracts, from the data catalog file 403 stored in advance in the ETL workflow recommendation device 100, information such as orders and sales related to a predetermined business domain as file information, and generates a file knowledge graph 411 from the extracted information. As an example, a file knowledge graph 411 may be generated from file information such as a file name of "OrderDetails.csv", author information of "User1", file contents of "order ID" and "order details", the creation date and time of the file, and the evaluation of the file.

It should be noted that an example of the file knowledge graph 411 will be described with reference to FIG. 13.

The organizational information management unit 408 extracts, from the organizational file 404, the structure of the organization, the number of employees, definitions of specific business terms, and the like as organizational information, and generates the organizational knowledge graph 412 from the extracted information. As an example, the organizational knowledge graph 412 may be generated from organizational information such as business terms of "order" and "net sales."

It should be noted that an example of the organizational knowledge graph 412 will be described with reference to FIG. 15.

After the ETL knowledge graph 409, the human resources knowledge graph 410, the file knowledge graph 411, and the organizational knowledge graph 412 have been generated, the knowledge aggregation unit 413 aggregates the ETL knowledge graph 409, the human resources knowledge graph 410, the file knowledge graph 411, and the organizational knowledge graph 412 to generate the overall knowledge graph 450. As described above, the overall knowledge graph 450 is stored in the knowledge database 103 and is used to determine the recommended ETL workflows with respect to a user input from the user.

Next, with reference to FIG. 5, the logical configuration of the output management unit in the ETL workflow recommendation device according to the embodiments of the present disclosure will be described.

Figure 5:
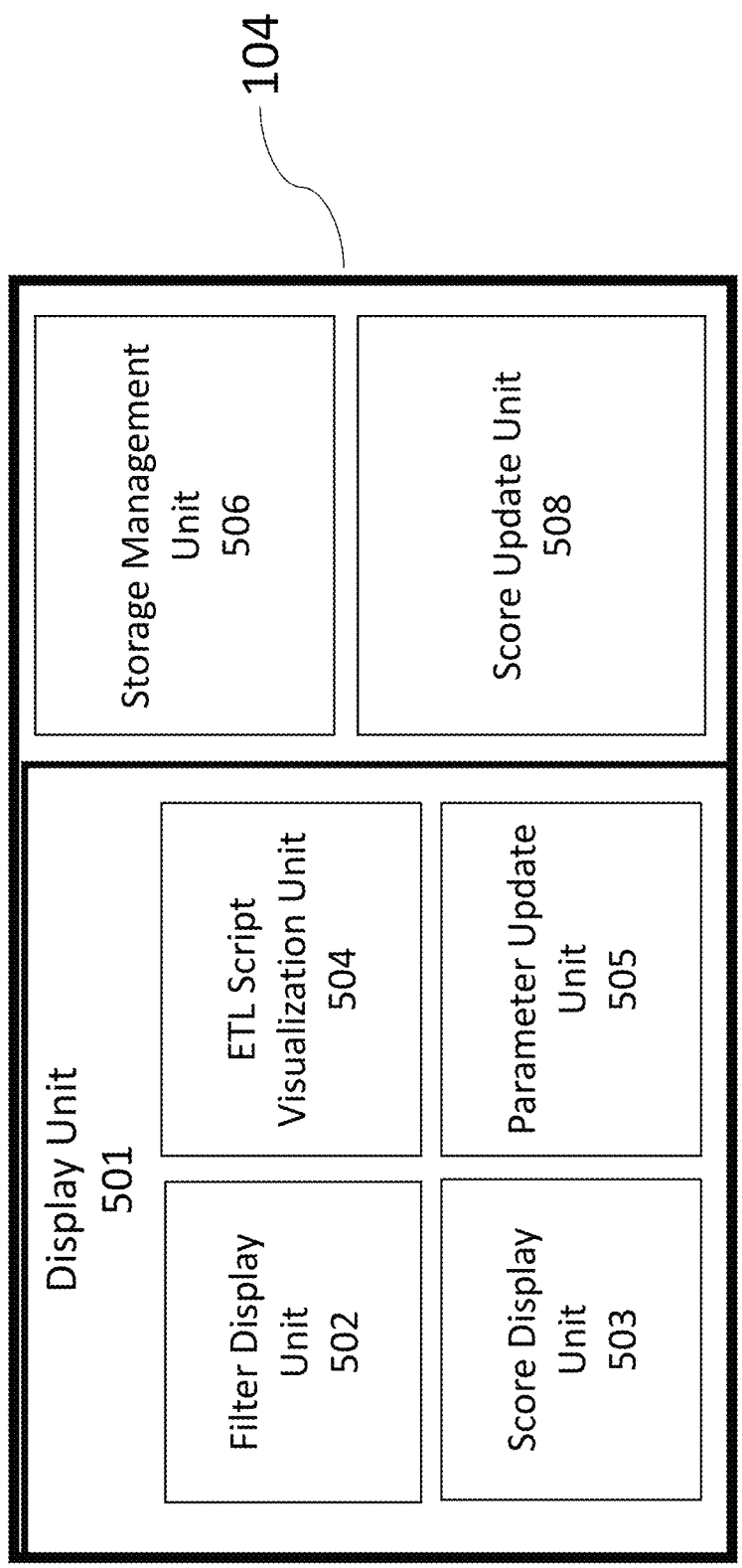
FIG. 5 is a diagram illustrating an example of the logical configuration of an output management unit in the ETL workflow recommendation device according to the embodiments of the present disclosure.

FIG. 5 is a diagram illustrating an example of the logical configuration of the output management unit 104 in the ETL workflow recommendation device 100 according to the embodiments of the present disclosure. As illustrated in FIG. 5, the output management unit 104 in the ETL workflow recommendation device 100 according to the embodiments of the present disclosure primarily includes a display unit 501, a storage management unit 506, and a score update unit 508.

The display unit 501 is a functional unit for displaying an ETL workflow report indicating a recommended ETL workflow. The display unit 501 may be, for example, an external display connected to the ETL workflow recommendation device 100. In addition, as illustrated in FIG. 5, the display unit 501 includes a filter display unit 502, a score display unit 503, an ETL script visualization unit 504, and a parameter update unit 505.

The filter display unit 502 is a functional unit for filtering Key Performance Indicator (KPI) parameters related to recommended ETL workflows. The filter display 502 allows users to confirm or adjust the weights of the KPI parameters related to the recommended ETL workflows.

The score display unit 503 is a functional unit for displaying the evaluation score calculated for a recommended ETL workflow.

The ETL script visualization unit 504 is a functional unit for visualizing and displaying the flow of a recommended ETL workflow.

The parameter update unit 505 is a functional unit for updating the results of a recommended ETL workflow according to the KPI parameters adjusted by the user.

By means of the output management unit 104 configured as described above, a user can easily confirm the ETL workflow report that indicates recommended ETL workflows.

Next, with reference to FIG. 6, an example of an ETL file according to the embodiments of the present disclosure will be described.

Figure 6:
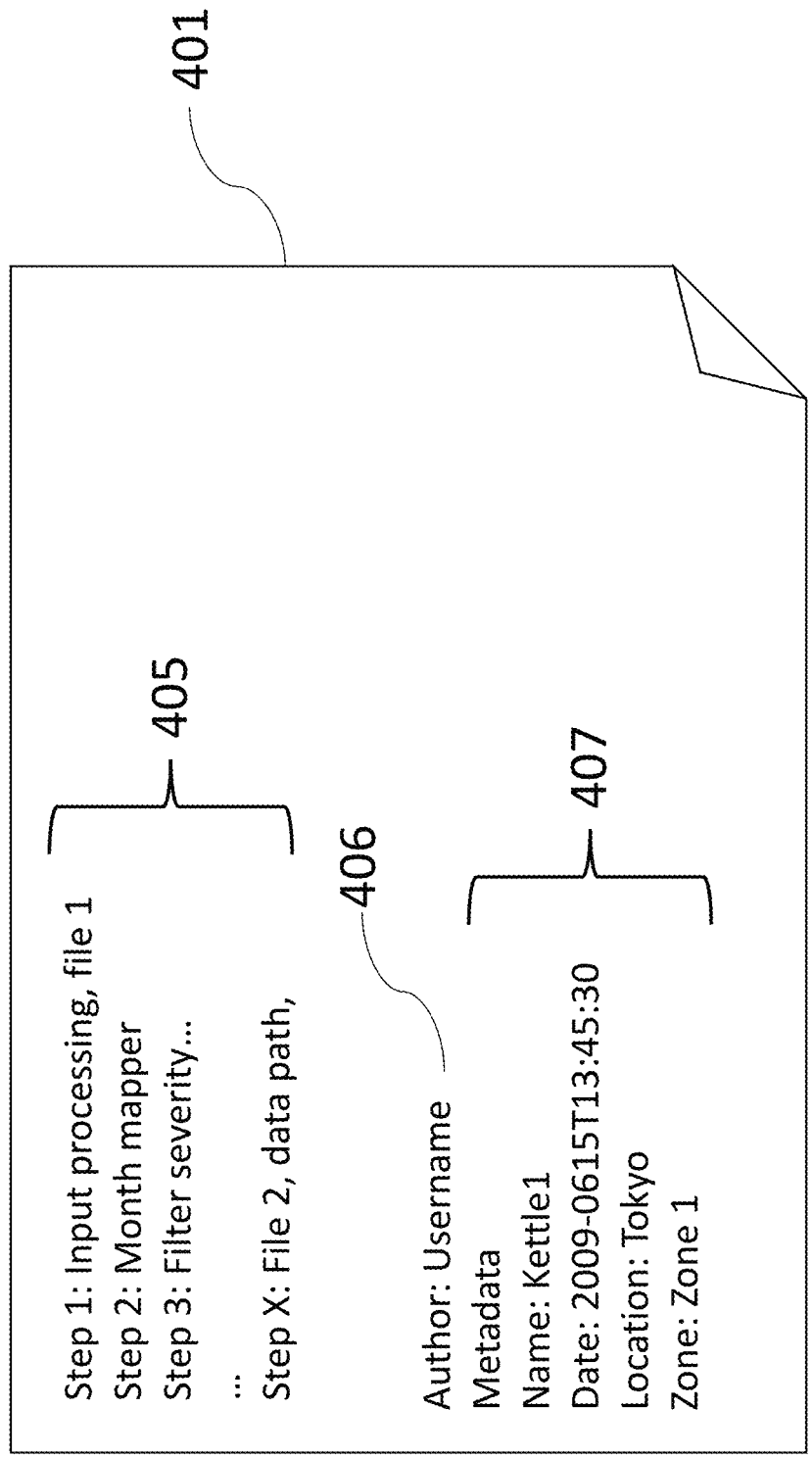
FIG. 6 is a diagram illustrating an example of an ETL file according to the embodiments of the present disclosure.

FIG. 6 is a diagram illustrating an example of an ETL file 401 according to the embodiments of the present disclosure.

As described above, the overall knowledge graph according to the embodiments of the present disclosure is generated based on ETL information, human resources information, data catalog files, and organizational information. Here, the ETL information is information extracted from an ETL file 401 stored in advance in the ETL workflow recommendation device 100, and may include, for example, step information, author information, metadata information, and the like for an ETL workflow.

As an example, the ETL file 401 illustrated in FIG. 6 includes step information, author information, and metadata information for an ETL workflow. This information is extracted from the ETL file 401 as ETL information and used in creating the ETL knowledge graph included in the overall knowledge graph.

Next, with reference to FIG. 7, an example of an ETL knowledge graph according to the embodiments of the present disclosure will be described.

Figure 7:
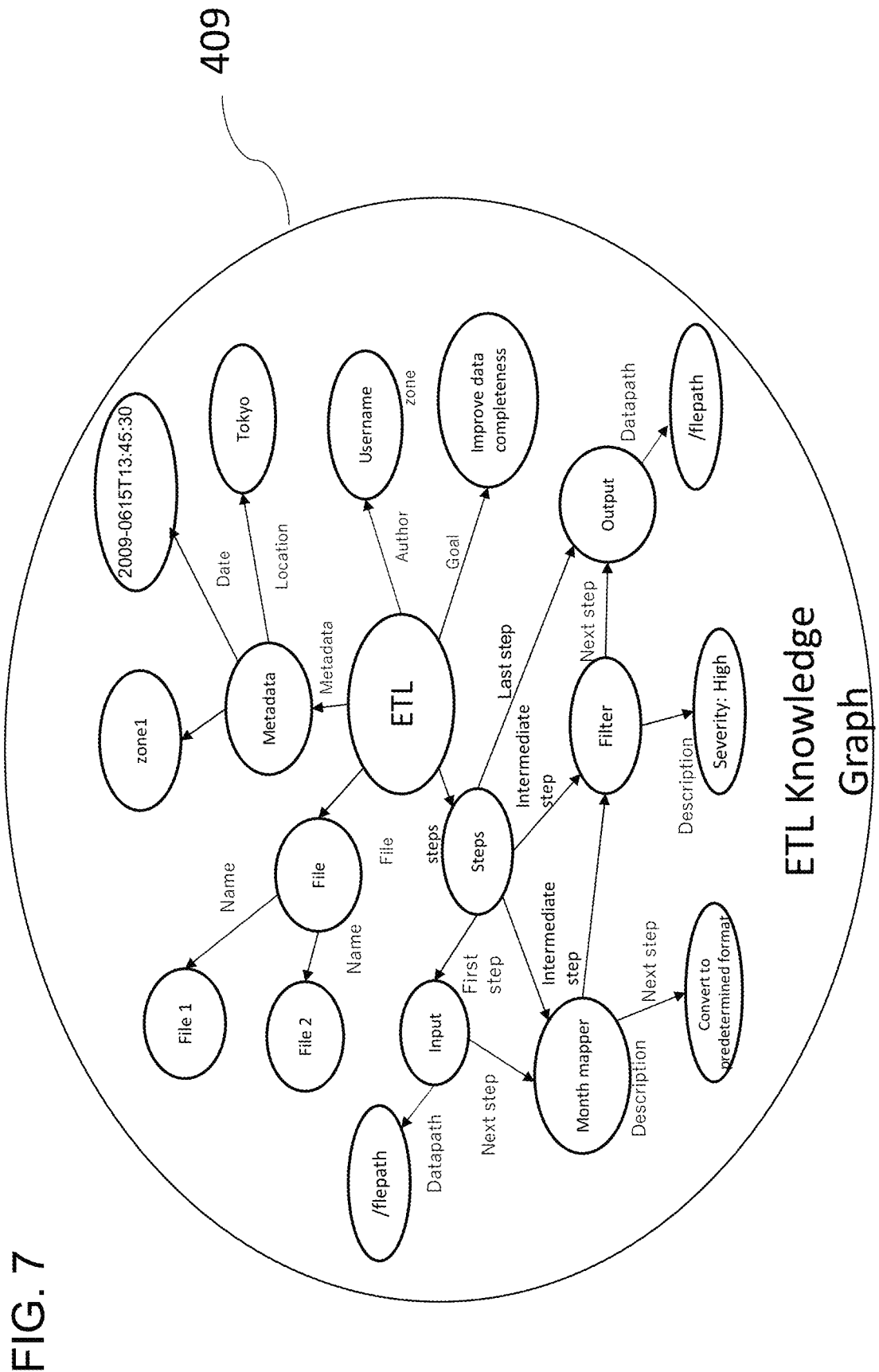
FIG. 7 is a diagram illustrating an example of an ETL knowledge graph according to the embodiments of the present disclosure.

FIG. 7 is a diagram illustrating an example of an ETL knowledge graph 409 according to the embodiments of the present disclosure. Here, the ETL knowledge graph 409 is a data structure for representing the ETL information extracted from the ETL file in a graph format, and is part of the overall knowledge graph used in generating the recommended ETL workflows with respect to a user input, as described above.

The ETL knowledge graph 409 illustrated in FIG. 7 is an ETL knowledge graph generated based on the ETL information extracted from the ETL file 401 described above with reference to FIG. 6. As illustrated in FIG. 7, in the ETL knowledge graph 409, each element of the ETL information extracted from the ETL file 401 is represented as an individual graph node according to its relationship with the other elements. For example, as illustrated in FIG. 7, the steps of the ETL workflow, the author information, the goal information, metadata, and the like are represented in a graph format.

As described above, the ETL knowledge graph 409 may be combined with a human resources knowledge graph, a file knowledge graph, and an organizational knowledge graph to construct an overall knowledge graph for use in generating a recommended ETL workflow with respect to a user input.

Next, with reference to FIG. 8, an example of a human resources database according to the embodiments of the present disclosure will be described.

FIG. 8 is a diagram illustrating an example of a human resources database 402 according to the embodiments of the present disclosure.

As described above, the overall knowledge graph according to the embodiments of the present disclosure is generated based on ETL information, human resources information, data catalog files, and organizational information. The human resources information here is information relating to human resources belonging to an organization (a company or the like) related to a predetermined business domain, and may include, for example, identification information, role information, work location information, department information, field-of-expertise information, and the like. This human resources information may be extracted from a predetermined human resources database 402, for example.

As examples, the human resources database 402 illustrated in FIG. 8 may include an ID 801 and a name 802 for identifying a particular human resource, a role 803 such as a data scientist or data analyst, a work location 804 for the human resource such as Tokyo or New York, a department 805 such as data science or data collection, and a field-of-expertise 806 such as ML-SVM or Analytics. These pieces of information are extracted from the human resources database 402 as human resources information, and are used when creating the human resources knowledge graph included in the overall knowledge graph.

Next, with reference to FIG. 9, an example of a human resources knowledge graph according to the embodiments of the present disclosure will be described.

Figure 9:
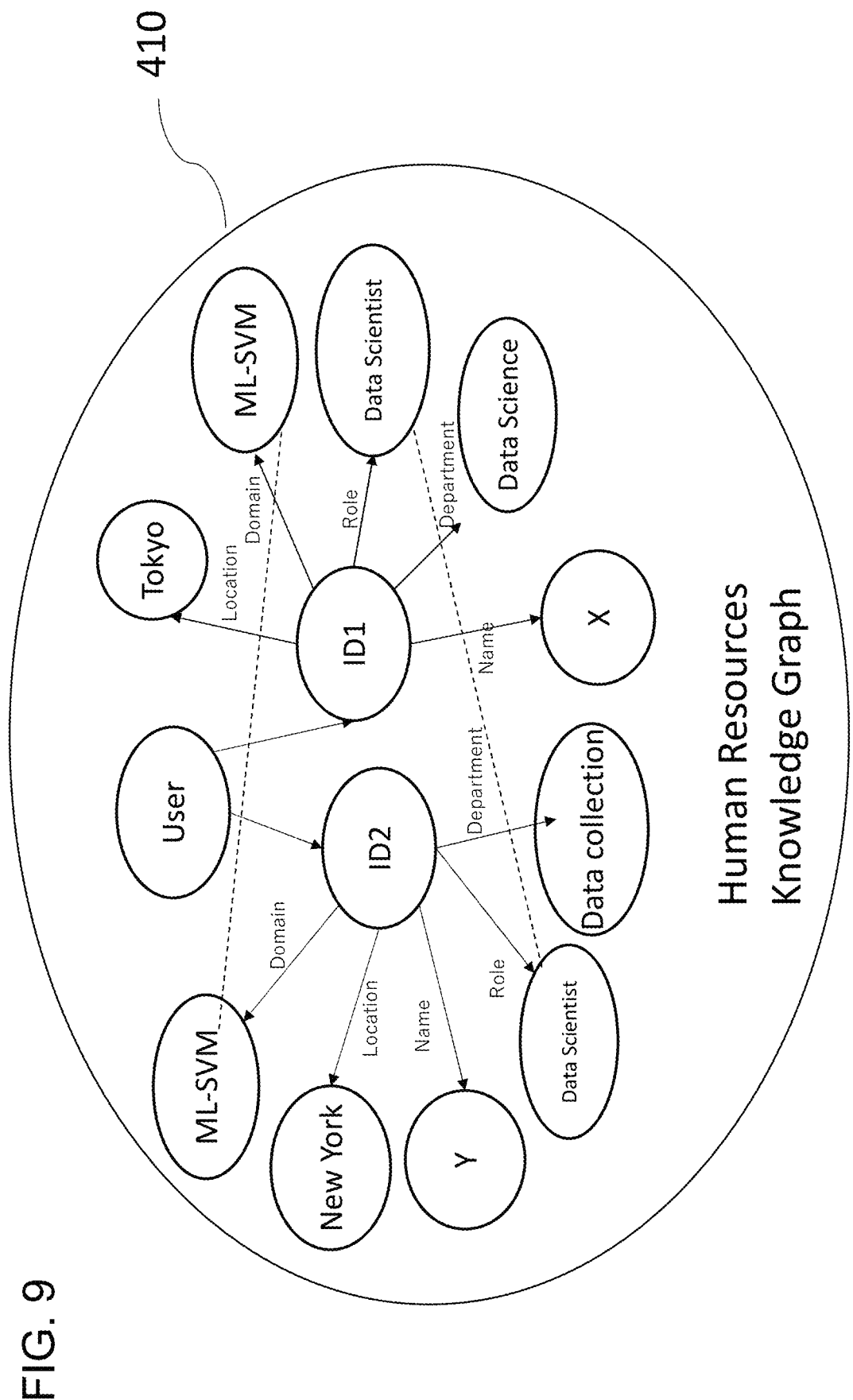
FIG. 9 is a diagram illustrating an example of a human resources knowledge graph according to the embodiments of the present disclosure.

FIG. 9 is a diagram illustrating an example of a human resources knowledge graph 410 according to the embodiments of the present disclosure. Here, the human resources knowledge graph 410 here is a data structure for representing the human resources information extracted from a human resources database (for example, the human resources database 402 illustrated in FIG. 8) in a graph format, and is a part of the overall knowledge graph used in generating the recommended ETL workflows with respect to a user input, as described above.

The human resources knowledge graph 410 illustrated in FIG. 9 is a human resources knowledge graph generated based on the human resources information extracted from the human resources database 402 described above with reference to FIG. 8. As illustrated in FIG. 9, in the human resources knowledge graph 410, each element of the human resources information extracted from the human resources database 402 is represented as an individual graph node according to its relationships with the other elements. For example, as illustrated in FIG. 9, IDs and names for identifying particular human resources, roles of data scientist and data analyst, work locations for human resources such as Tokyo and New York, departments such as data science and data collection, and fields-of-expertise such as ML-SVM and Analytics are represented in a graph format.

As described above, the human resources knowledge graph 410 may be combined with an ETL knowledge graph, a file knowledge graph, and an organizational knowledge graph to construct an overall knowledge graph for use in generating a recommended ETL workflow with respect to a user query.

Next, with reference to FIG. 10, an example of a similarity index according to the embodiments of the present disclosure will be described.

FIG. 10 is a diagram illustrating an example of a similarity index 381 according to the embodiments of the present disclosure. As described above, when evaluating ETL workflows, the ETL workflow recommendation device 100 according to the embodiments of the present disclosure may generate an overall score for ETL workflows based on the goal, role, and domain correspondence relationship information 380, the similarity index 381, and the ETL characteristics 382.

FIG. 10 illustrates an example of the similarity index 381. Here, the similarity index 381 is a data file indicating the similarity of different human resources. As illustrated in FIG. 10, in the similarity index 381, the similarity of a plurality of human resources (for example, human resources whose information is stored in the human resources database 402) is calculated based on work locations, fields-of-expertise, roles, and departments, and is represented as work location similarity 1001, field-of-expertise similarity 1002, role similarity 1003, and department similarity 1004.

Here, the similarity of the human resources may be calculated for each category such as work location, field-of-expertise, role, and department by a predetermined algorithm executed by the overall score generation unit 379 illustrated in FIG. 3. For example, as illustrated in the role similarity 1003, the roles of "data scientist" and "software engineer" may have a similarity score of 0.6, and roles of "data scientist" and "data analysis" may have a similarity score of 0.85. As another example, as illustrated in work location similarity 1001, work locations of "Tokyo" and "Osaka" may have a similarity score of "0.9," and work locations of "Tokyo" and "New York" may have a similarity score of "0.6".

The overall similarity score of a specific human resource may be the average of the work location similarity 1001, the field-of-expertise similarity 1002, the role similarity 1003, and the department similarity 1004. For example, in the case that the overall similarity of a data scientist A who belongs to a data science department of an organization in Tokyo and has a field-of-expertise of ML-SVM and a data scientist B who belongs to a data collection department of an organization in New York and has a field-of-expertise of ML-SVM is calculated, the similarity is 0.85 ((1+0.6+0.8+1)/4=0.85).

As described above, this human resource similarity index 381 may be used in evaluating ETL workflows.

Next, with reference to FIG. 11, an example of correspondence relationship information for a goal, a role, and a domain according to the embodiments of the present disclosure will be described.

FIG. 11 is a diagram illustrating an example of correspondence relationship information for a goal, a role, and a domain according to the embodiments of the present disclosure. As described above, when evaluating ETL workflows, the ETL workflow recommendation device 100 according to the embodiments of the present disclosure may generate an overall score for ETL workflows based on the goal, role, and domain correspondence relationship information 380, the similarity index 381, and the ETL characteristics 382.

FIG. 11 illustrates an example of the goal, role, and domain correspondence relationship information 380. Here, the goal, role, and domain correspondence relationship information 380 is information that indicates the correspondence relationship between a goal 1101 of the ETL file and a field-of-expertise 1102 and a role 1103 of a human resource. According to the goal, role, and domain correspondence relationship information 380, in cases in which a goal of the ETL file is not designated, or in cases in which the field-of-expertise or the role of a human resource cannot be identified because the human resource has left the organization, for example, the missing information can be estimated from the correspondence relationship between the goal 1101, the field-of-expertise 1102, and the role 1103 illustrated in the goal, role, and domain correspondence relationship information 380.

As an example, in the case that a human resource belonging to an organization creates an ETL file with a goal of "improving data quality" and then leaves the organization such that information such as the field-of-expertise and role of this human resource cannot be identified, based on the goal of "improving data quality" from the goal, role, and domain correspondence relationship information 380, it is possible to infer that the field-of-expertise of this human resource is "ML-SVM" and their role is "data scientist." In this way, when creating the similarity index 381 as described above, even in cases in which the goal of the ETL file is not designated or when the field-of-expertise or role of the human resource cannot be identified because the human resource has left the organization, the missing information can be estimated and the similarity index 381 can be created.

Next, with reference to FIG. 12, an example of a data catalog file according to the embodiments of the present disclosure will be described.

Figure 12:
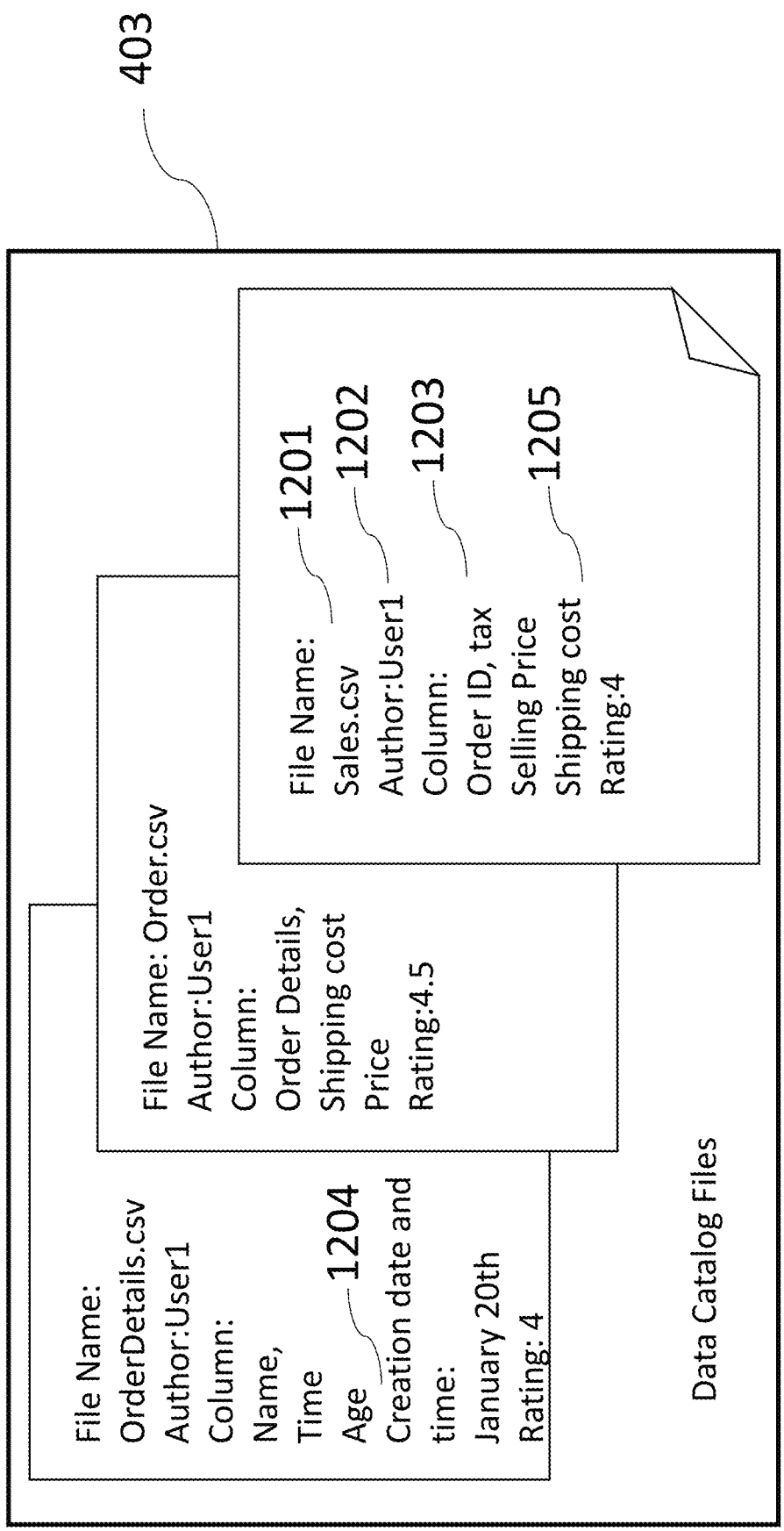
FIG. 12 is a diagram illustrating an example of a data catalog file according to the embodiments of the present disclosure.

FIG. 12 is a diagram illustrating an example of the data catalog file 403 according to the embodiments of the present disclosure. As described above, the overall knowledge graph according to the embodiments of the present disclosure is generated based on ETL information, human resources information, file information, and organizational information. The file information here is information regarding a data catalog file stored in advance in the ETL workflow recommendation device 100 for a predetermined business domain, and may include, for example, order and sales information for the predetermined business domain. The file information may be extracted from a data catalog file 403 stored in advance in the ETL workflow recommendation device 100, for example.

As an example, the data catalog file 403 illustrated in FIG. 12 may include information such as a file name 1201 such as "OrderDetails.csv", "Order.csv", or "Sales.csv", a file author 1202 such as User1, content 1203 included in the file such as "order ID" or "order details," a file creation date and time 1204, and a file evaluation 1205. This information is extracted from the data catalog file 403 as file information and used when creating the file knowledge graph included in the overall knowledge graph.

Next, with reference to FIG. 13, an example of a file knowledge graph according to the embodiments of the present disclosure will be described.

Figure 13:
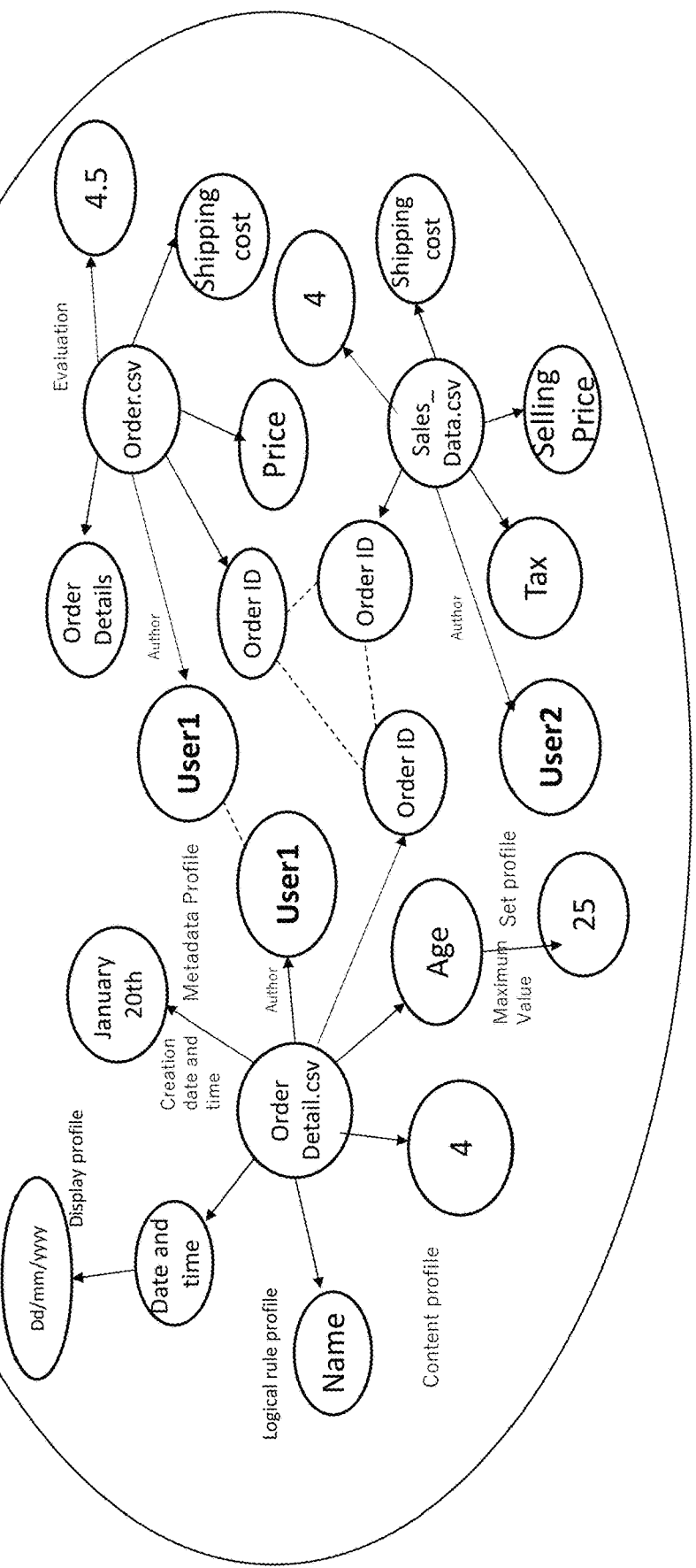
FIG. 13 is a diagram illustrating an example of a file knowledge graph according to the embodiments of the present disclosure.

FIG. 13 is a diagram illustrating an example of a file knowledge graph 411 according to the embodiments of the present disclosure. Here, the file knowledge graph 411 is a data structure for representing the file information extracted from a data catalog file (for example, the data catalog file 403 illustrated in FIG. 12) in a graph format, and is a part of the overall knowledge graph used in generating the recommended ETL workflows with respect to a user input, as described above.

The file knowledge graph 411 illustrated in FIG. 13 is a file knowledge graph generated based on the file information extracted from the data catalog file 403 described above with reference to FIG. 12. As illustrated in FIG. 13, in the file knowledge graph 411, each element of the file information extracted from the data catalog file 403 is represented as an individual graph node according to its relationship with the other elements. For example, as illustrated in FIG. 13, the file names such as "OrderDetails.csv", "Order.csv", and "Sales.csv", the file author such as User1, the content included in the file such as "order ID" and "order details", the file creation date and time, the file evaluation, and the like are represented in a graph format.

As described above, the file knowledge graph 411 may be combined with an ETL knowledge graph, a human resources knowledge graph, and an organizational knowledge graph to construct an overall knowledge graph for use in generating a recommended ETL workflows with respect to a user input.

Next, with reference to FIG. 14, an example of an organizational file 404 according to the embodiments of the present disclosure will be described.

Figure 14:
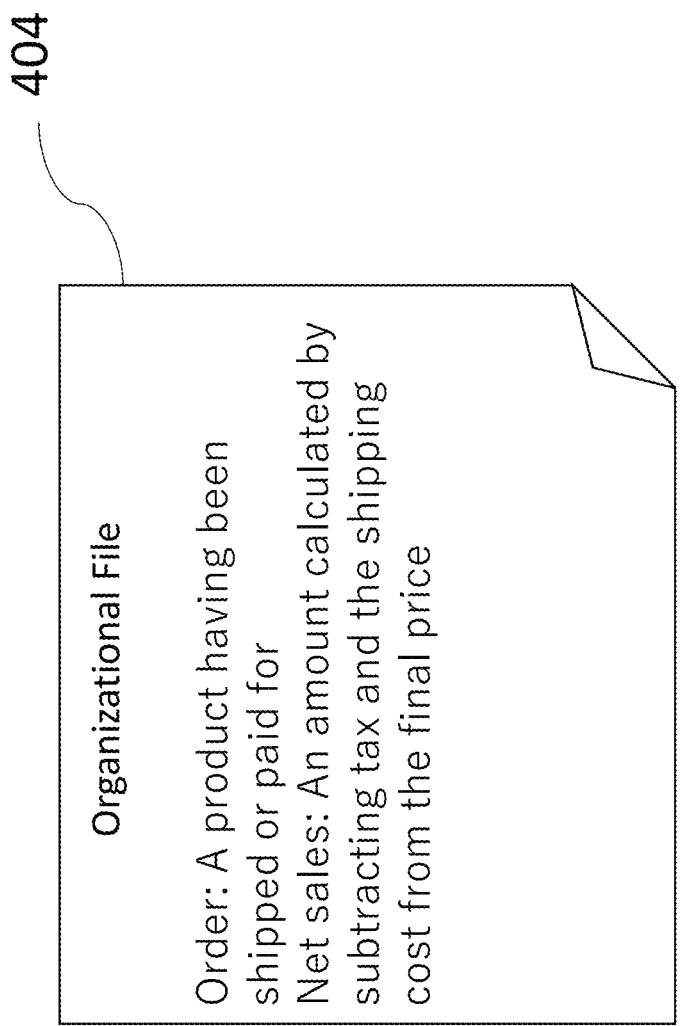
FIG. 14 is a diagram illustrating an example of an organizational file according to the embodiments of the present disclosure.

FIG. 14 is a diagram illustrating an example of the organizational file 404 according to the embodiments of the present disclosure. As described above, the overall knowledge graph according to the embodiments of the present disclosure is generated based on ETL information, human resources information, file information, and organizational information. The organizational information here is information that indicates the composition and characteristics of a specific organization in a predetermined business domain, and may include, for example, definitions of business terms specific to the organization. This organizational information may be extracted from an organizational file 404 stored in in advance in the ETL workflow recommendation device 100, for example.

Different organizations (or different departments belonging to the same organization) may have different definitions of business terms. For example, in a department that manages electronic transactions, the business term "order" may mean that a user presses a "confirm order" button on a website, while in a department that manages product shipments, the business term "order" may mean that a product has arrived to the customer.

Accordingly, in order to accurately provide the information requested by the user in the case of a user query of "What are the orders and net sales over the past three months?", it is important to understand how the information of "order" and "net sales" stored in the ETL workflow recommendation device 100 is defined.

Thus, as described above, in the present disclosure, organizational information defining the definitions of business terms such as "order" and "net sales" is extracted from the organizational file 404, and the extracted information is included in the overall knowledge graph, thereby making it possible to recommend an accurate ETL workflow corresponding to the user query.

As an example, in the organizational file 404 illustrated in FIG. 14, the business term "order" is defined as "a product having been shipped or paid for" and the business term "net sales" is defined as "an amount calculated by subtracting tax and the shipping cost from the final price." These pieces of information are extracted from the organizational file 404 as organizational information, and are used when creating the organizational knowledge graph included in the overall knowledge graph.

Figure 15:
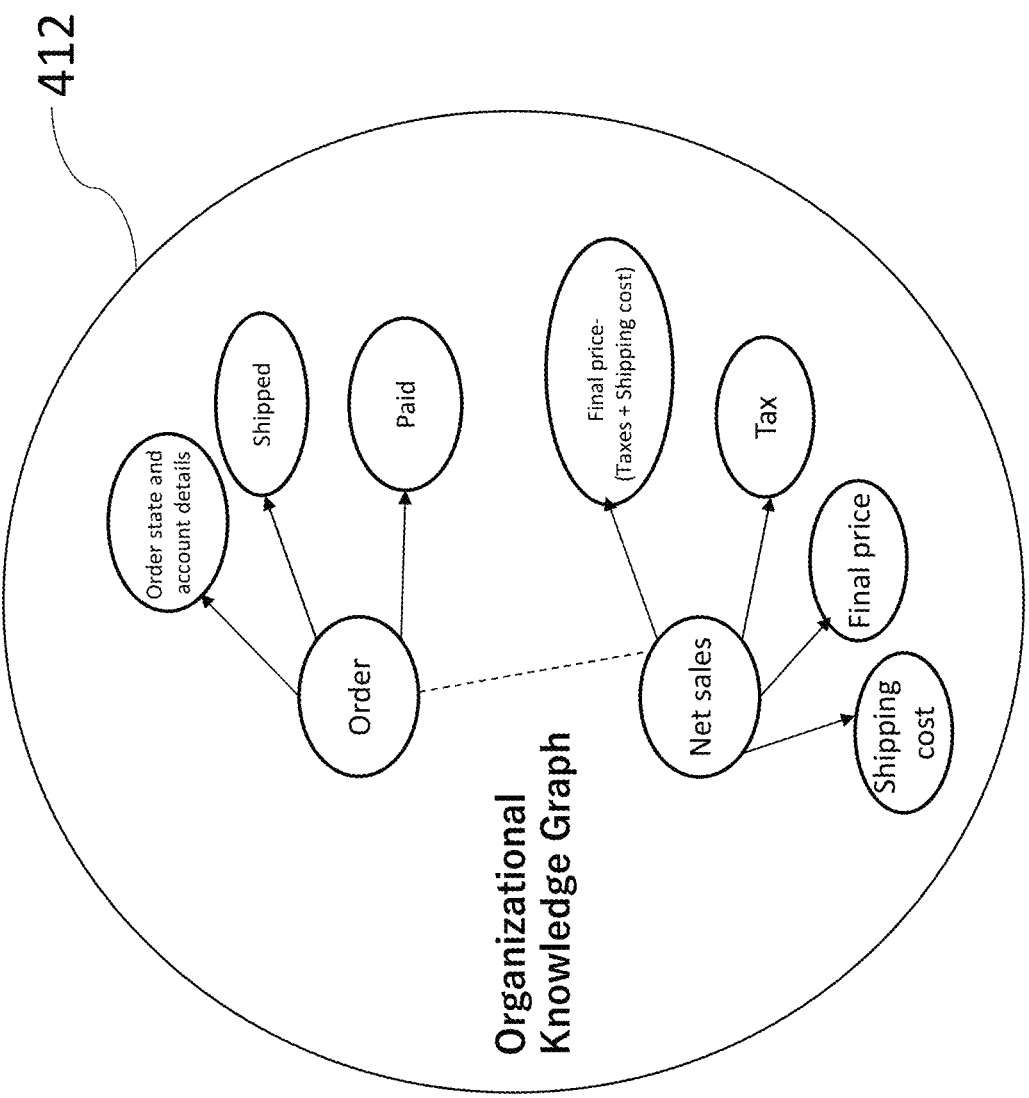
FIG. 15 is a diagram illustrating an organizational knowledge graph according to the embodiments of the present disclosure.

FIG. 15 is a diagram illustrating an organizational knowledge graph 412 according to the embodiments of the present disclosure. Here, the organizational knowledge graph 412 is a data structure for representing the organizational information extracted from an organizational file (for example, the organizational file 404 illustrated in FIG. 12) in a graph format, and is a part of the overall knowledge graph used in generating the recommended ETL workflows with respect to a user input, as described above.

The organizational knowledge graph 412 illustrated in FIG. 15 is an organizational knowledge graph generated based on the file information extracted from the organizational file 404 described above with reference to FIG. 14. As illustrated in FIG. 15, in the organizational knowledge graph 412 illustrated in FIG. 15, each element of the organizational information extracted from the organizational file 404 is represented as an individual graph node according to its relationship with the other elements. For example, as illustrated in FIG. 15, the components of the definitions of business terms such as "order," "net sales," and the like, and the business term such as "shipped" and "shipping cost" are represented in a graph format.

As described above, the organizational knowledge graph 412 may be combined with an ETL knowledge graph, a human resources knowledge graph, and a file knowledge graph to construct an overall knowledge graph for use in generating a recommended ETL workflow with respect to a user input.

Next, with reference to FIG. 16, an example of an overall knowledge graph according to the embodiments of the present disclosure will be described.

Figure 16:
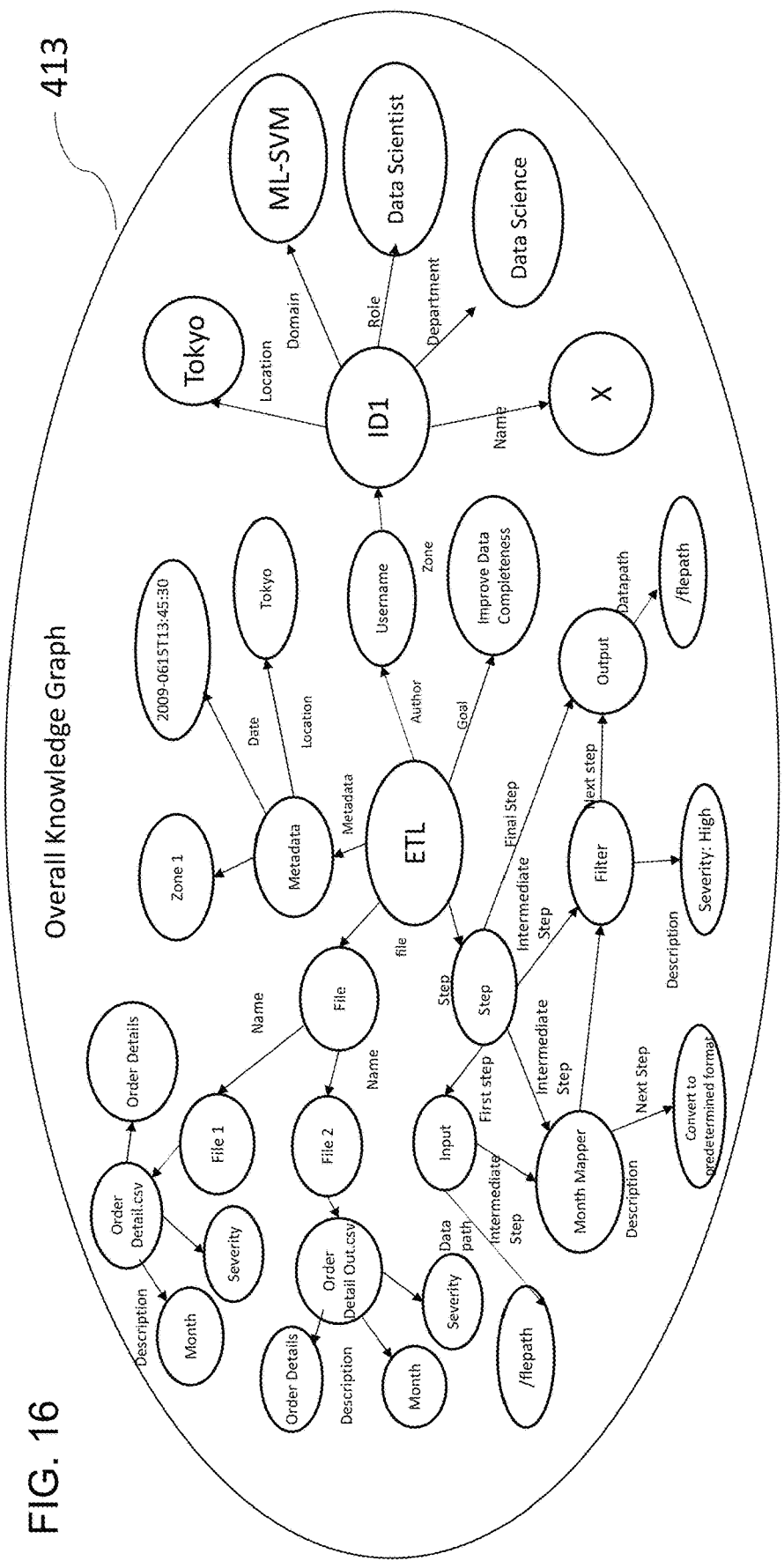
FIG. 16 is a diagram illustrating an example of an overall knowledge graph according to the embodiments of the present disclosure.

FIG. 16 is a diagram illustrating an example of an overall knowledge graph 450 according to the embodiments of the present disclosure. Here, the overall knowledge graph 450 is a data structure for aggregating the information extracted from the ETL file 401, the human resources database 402, the data catalog file 403, and the organizational file 404, (the ETL information, the human resources information, the file information, and the organizational information) and representing it in a graph format, and is used in generating the recommended ETL workflows with respect to a user input, as described above.

As illustrated in FIG. 16, the overall knowledge graph includes ETL information such as ETL workflow step information, author information, and metadata, human resources information such as human resource identification information, role information, work location information, department information, and field-of-expertise information; file information such as orders and sales regarding a predetermined business domain; organizational information such as an organizational structure, number of employees, and definitions of specific business terms; and each element of various information is represented as an individual graph node according to its relationship with the other elements.

As described above, by searching the overall knowledge graph 450 using a graph query corresponding to the user input, recommended ETL workflows can be determined with respect to the user query.

Next, with reference to FIG. 17, an ETL workflow recommendation system according to the embodiments of the present disclosure will be described.

Figure 17:
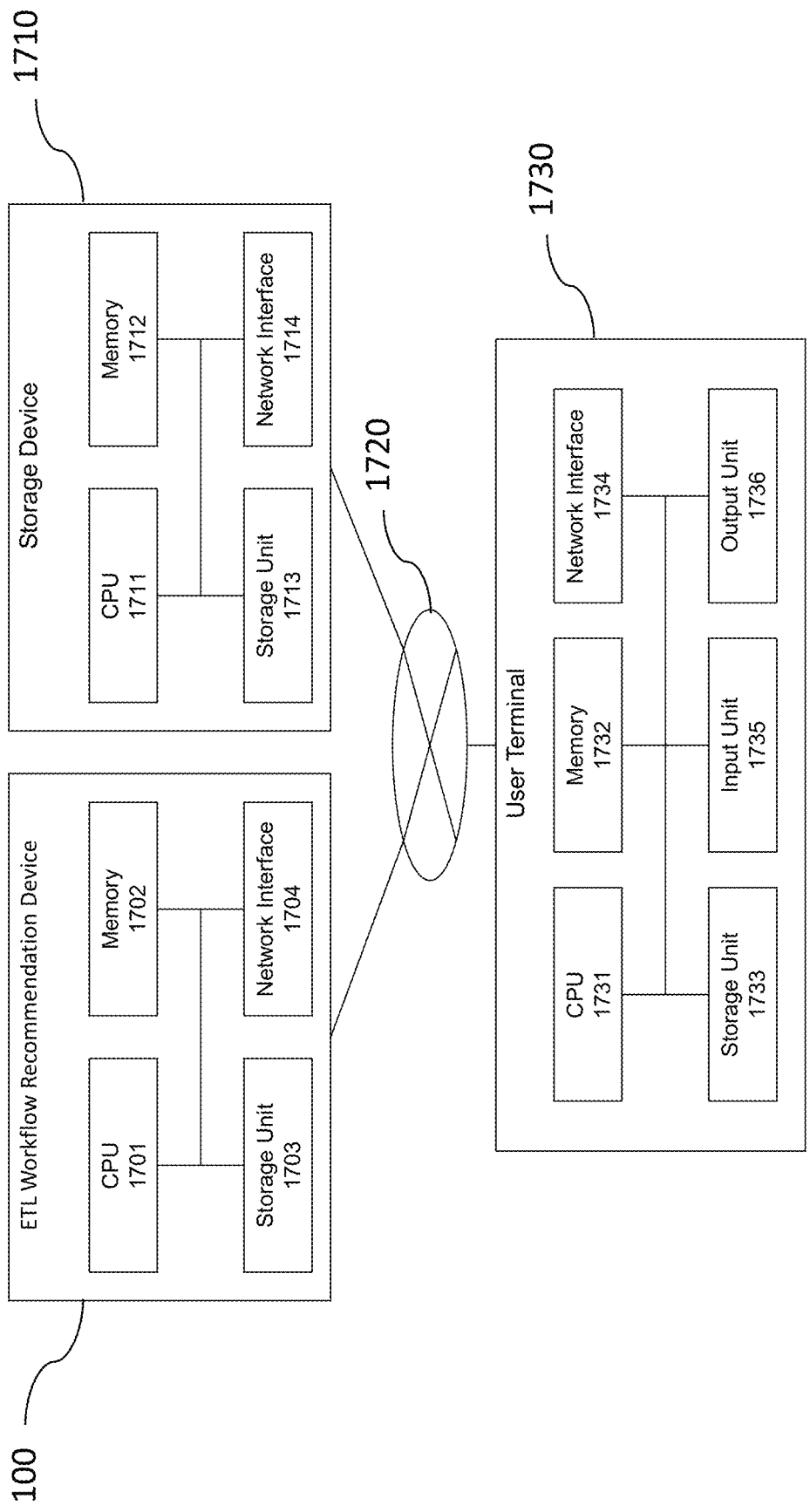
FIG. 17 is a diagram illustrating an example of an ETL workflow recommendation system according to the embodiments of the present disclosure.

FIG. 17 is a diagram illustrating an example of the ETL workflow recommendation system 1700 according to the embodiments of the present disclosure. As illustrated in FIG. 17, the ETL workflow recommendation system 1700 consists primarily of an ETL workflow recommendation device 100, a storage device 1710, and a user terminal 1730.

The ETL workflow recommendation device 100, the storage device 1710, and the user terminal 1730 are connected via a communication network 1720 such as the Internet or a LAN.

As illustrated in FIG. 17, the ETL workflow recommendation device 100 includes a CPU 1701 and memory 1702 for performing various operations for executing the functions of the embodiments of the present disclosure, a storage unit 1703 for storing a knowledge database (for example, the knowledge database 103 illustrated in FIG. 1), and a network interface 1704 for transmitting and receiving data via the communication network 1720.

The ETL workflow recommendation device 100 uses the CPU 1701, the memory 1702, the storage unit 1703, and the network interface 1704 to execute the functions of the functional units described with reference to FIG. 1.

It should be noted that as the details of the functions of the ETL workflow recommendation device 100 have been described with reference to FIGS. 1, 2, 3, 5, and the like, description thereof will be omitted here.

The storage device 1710 is a device for storing the various kinds of information used in the ETL workflow recommendation device 100, and may store the ETL file 401, the human resources database 402, the data catalog file 403, the organizational file 404, and the like illustrated in FIG. 4 so as to be accessible by the ETL workflow recommendation device 100, for example.

As illustrated in FIG. 17, the storage device 1710 includes a CPU 1711 and a memory 1712 for performing various operations, a storage unit 1713 for storing various kinds of information, and a network interface 1714 for transmitting and receiving data via the communication network 1720.

It should be noted that, although the ETL workflow recommendation device 100 and the storage device 1710 are illustrated as separate devices in FIG. 17, the present disclosure is not limited to this, and the ETL workflow recommendation device 100 and the storage device 1710 may be integrated together.

The user terminal 1730 is a terminal of the user who uses the ETL workflow recommendation device 100. The user may, for example, use the user terminal 1730 to input input information such as a user query to the ETL workflow recommendation device 100, or to confirm the ETL workflow report output from the ETL workflow recommendation device 100. The user terminal 1730 may be any device such as a desktop computer, a notebook computer, a smart phone, or a tablet.

As illustrated in FIG. 17, the user terminal 1730 includes a CPU 1731 and a memory 1732 for performing various operations, a storage unit 1733 for storing various kinds of information, a network interface 1734 for transmitting and receiving data via the communication network 1720, an input unit 1735 for receiving a user input, and an output unit 1736 for outputting information.

Next, with reference to FIG. 18, an ETL workflow recommendation method according to the embodiments of the present disclosure will be described.

Figure 18:
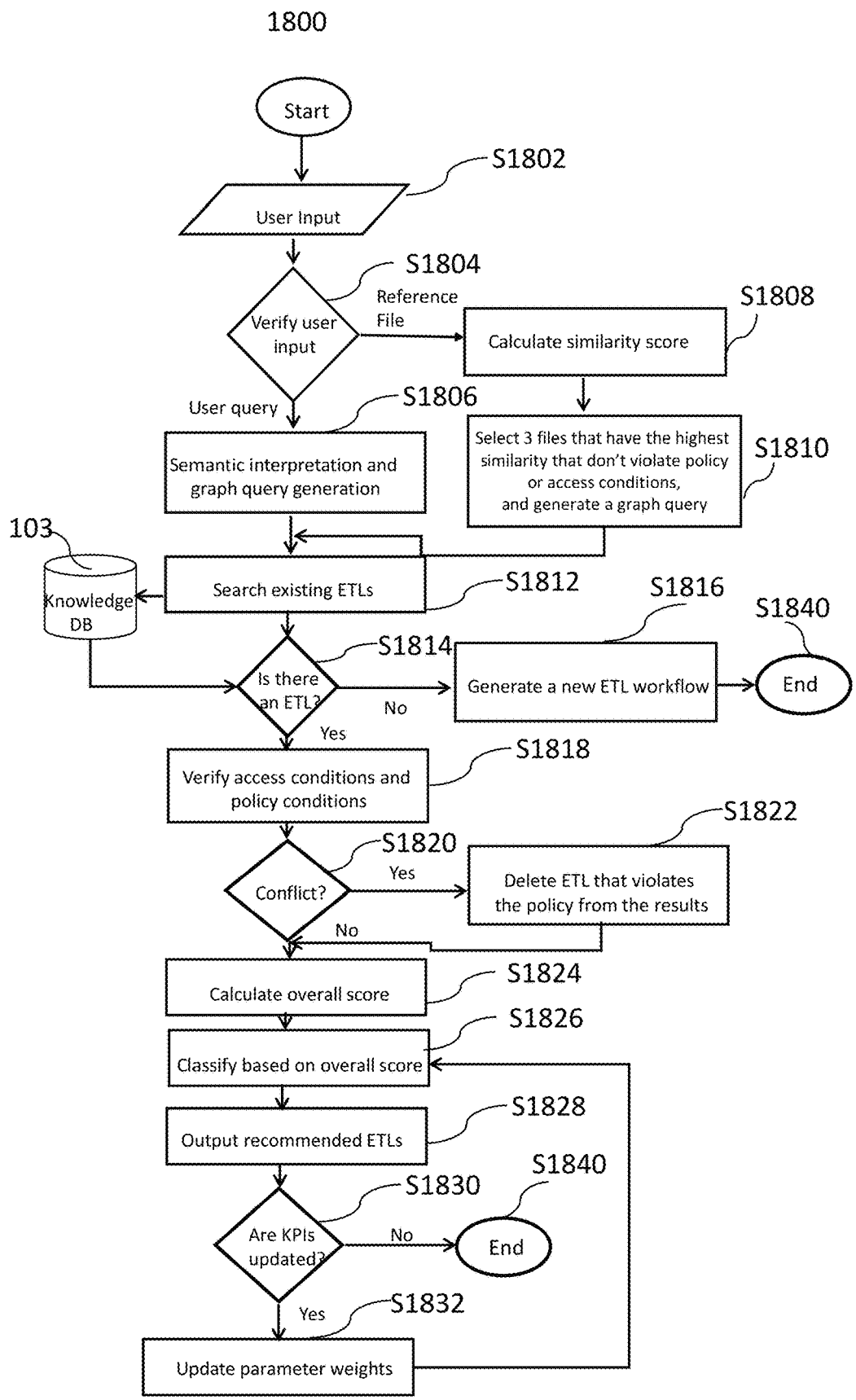
FIG. 18 is a diagram illustrating an example of an ETL workflow recommendation method according to the embodiments of the present disclosure.

FIG. 18 is a diagram illustrating an example of an ETL workflow recommendation method 1800 according to the embodiments of the present disclosure. The ETL workflow recommendation method 1800 illustrated in FIG. 18 is a method for determining recommended ETL workflows with respect to a user input, and is a method executed by the functional units of the ETL workflow recommendation device 100 illustrated in FIG. 1.

First, in Step S1802, the input management unit of the ETL workflow recommendation device (for example, the input management unit 101 illustrated in FIG. 1) receives a user input from a user. As described above, this user input may include desired ETL workflow goals, business terms, user queries such as "What are the orders and net sales over the past three months?" and/or reference files or the like.

Next, in Step S1804, the input management unit verifies the user input received in Step S1802, and determines whether it is a user query or a reference file. In the case that the user input is a user query, the processing proceeds to Step S1808, and in the case that the user input is a reference file, the processing proceeds to Step S1806.

Next, in Step S1806, the ETL recommendation unit of the ETL workflow recommendation device (for example, the ETL recommendation unit 102 illustrated in FIG. 1) executes a semantic interpretation process with respect to the user query received in Step S1804, and then generates a graph query corresponding to the user query.

In Step S1808, the ETL recommendation unit calculates the similarity of the reference file received in Step S1804 to the existing files stored in the ETL workflow recommendation device based on the data profiles of these files.

In Step S1810, the ETL recommendation unit selects, as a result of the similarity calculation in Step S1806, the three files that have the highest similarity to the reference file and that satisfy both the policy conditions and the access conditions, and generates, based on the three selected files, a graph query for searching the overall knowledge graph stored in the knowledge database 103.

Next, in Step S1812, the ETL recommendation unit uses the graph query generated in Step S1806 or Step S1810 to search the overall knowledge graph stored in the knowledge database to determine whether there is an existing ETL workflow that corresponds to the graph query. For example, here, the ETL recommendation unit may determine whether or not there is an existing ETL workflow that satisfies a predetermined similarity with respect to the graph query.

Next, in Step S1814, the ETL recommendation unit determines, based on the results of the search in Step S1812, whether or not there is an existing ETL workflow that corresponds to the graph query. In the case that there is an existing ETL workflow that corresponds to the graph query, the processing proceeds to Step S1818, and if there is no existing ETL workflow that corresponds to the graph query, the processing proceeds to Step S1816.

In the case that there is no existing ETL workflow that corresponds to the graph query, in Step S1816, the ETL recommendation unit performs a process of generating a new ETL workflow that corresponds to the user query, and then the processing ends at Step S1840.

The process of generating a new ETL workflow that corresponds to the user query will be described with reference to FIG. 19.

In the case that there is an existing ETL workflow that corresponds to the graph query, in Step S1818, the ETL recommendation unit sets the searched ETL workflow as an ETL workflow candidate and performs access and policy control with respect to the ETL workflow candidates to determine whether or not the ETL workflow candidates satisfy the access conditions and policy conditions.

Here, as an access condition of the ETL workflow candidates, the ETL recommendation unit may verify whether or not the user of the ETL workflow recommendation device 100 is authorized to access the searched ETL workflows. In addition, as a policy condition of the ETL workflow candidates, the ETL recommendation unit may also verify whether or not the searched ETL workflows satisfy a predetermined policy (a localization policy, a security policy, or the like).

In Step S1820, in the case that the ETL recommendation unit determines that a searched ETL workflow candidate does not satisfy any one of the above-described access conditions and policy conditions, the processing proceeds to Step S1822. On the other hand, in the case that the ETL recommendation unit determines that the searched ETL workflow candidates satisfy both the above-described access condition and policy conditions, the processing proceeds to Step S1824.

In Step S1822, the ETL recommendation unit deletes the ETL workflows that were determined not to satisfy the access conditions or the policy conditions from the ETL workflow candidates. In the case that, as a result of deleting an ETL workflow that was determined not to satisfy the access conditions or the policy conditions, no ETL workflow candidates remain, the graph query may be refined at Step S1806 or Step S1810 (for example, by adding other files with higher similarity or changing the terms that compose the user query).

In Step S1824, the ETL recommendation unit calculates an overall score for each of the ETL workflow candidates. As described above, the overall score here is a measure that quantitatively indicates the appropriateness of an ETL workflow candidate with respect to a user input. Here, the ETL recommendation unit may calculate the overall score for each ETL workflow candidate based on the goal, role, and domain correspondence relationship information, the similarity index, ETL characteristics, data quality, performance, cost efficiency, security, usability, applicability, and the like.

Next, in Step S1826, the ETL recommendation unit classifies the ETL workflow candidates based on the overall scores calculated for each of the ETL workflow candidates in Step S1824. For example, here, the ETL recommendation unit may arrange the ETL workflow candidates starting with those that have the highest overall score.

Next, in Step S1828, the output management unit of the ETL workflow recommendation device, (for example, the output management unit 104 illustrated in FIG. 1) outputs an ETL workflow report indicating the recommended ETL workflows based on the ETL workflow candidates classified in Step S1828. Here, the output management unit may output, for example, the ETL workflow having the highest overall score among the ETL workflow candidates as the recommended ETL workflow, or may output a plurality of ETL workflows that satisfy a predetermined overall score criterion as recommended ETL workflows.

Next, in Step S1830, the output management unit determines whether or not the KPI parameters of the ETL workflows have been updated by the user. In the case that the KPI parameters have not been updated by the user, the processing proceeds to Step S1840 and ends. In the case that the KPI parameters have been updated by the user, the processing proceeds to Step S1832.

Next, in Step S1832, the output management unit updates the weights of the parameters used in calculating the overall scores of the ETL workflow candidates in Step S1824 based on the KPI parameters updated by the user. Subsequently, the processing returns to Step S1826.

According to the ETL workflow recommendation method 1800 described above, it is possible to recommend an ETL workflow for performing a specific task based on a user input related to a predetermined business domain, thereby increasing the efficiency of processes such as data preparation, data cleaning, data analysis and the like performed in companies, and promoting effective use of data.

Next, with reference to FIG. 19, the processing when updating the knowledge database according to the embodiments of the present disclosure will be described.

Figure 19:
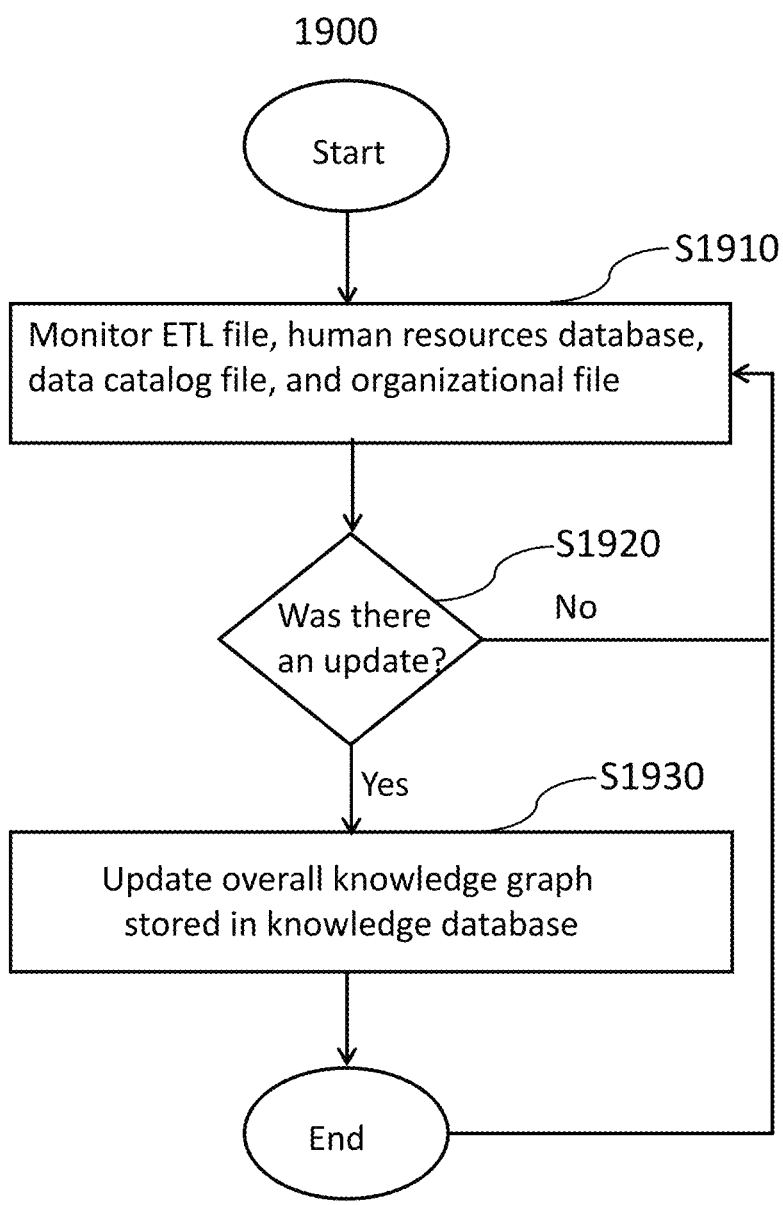
FIG. 19 is a diagram illustrating an example of processing when updating the knowledge database according to the embodiments of the present disclosure.

FIG. 19 is a diagram illustrating an example of a process 1900 performed when updating the knowledge database 103 according to the embodiments of the present disclosure. The process 1900 illustrated in FIG. 19 is a process for updating the knowledge database 103 with new information such as ETL information, human resources information, file information, and organizational information, and is a process performed by the knowledge database construction and update unit 383 illustrated in FIG. 3, for example.

First, in Step S1910, the knowledge database construction and update unit monitors the storage unit (for example, the storage unit 1713 of the storage device illustrated in FIG. 17) in which the ETL file (for example, the ETL file 401), the human resources database (for example, the human resources database 402), the data catalog file (for example, the data catalog file 403), and the organizational file (the organizational file 404) are stored, and when there is an update operation for modifying data of any of the ETL file, the human resources database, the data catalog file, or the organizational file, the knowledge database construction and update unit detects the update.

Update operations with respect to the ETL file, the human resources database, the data catalog file, and the organizational files include, for example, adding new data or modifying or deleting existing data. In addition, the update operation may also be, for example, an update performed manually by a user of the ETL workflow recommendation device 100, or an update performed automatically by the functions of the ETL workflow recommendation device 100.

In Step S1920, in the case that the knowledge database construction and update unit detects an update operation with respect to any one of the ETL file, the human resources database, the data catalog file, or the organizational file, the processing proceeds to Step S1930. On the other hand, in the case that the knowledge database construction and update unit does not detect an update of any of the ETL file, the human resources database, the data catalog file, or the organizational file, the processing returns to Step S1910.

In Step S1930, the knowledge database construction and update unit updates the overall knowledge graph stored in the knowledge database construction and update unit in accordance with the update operation detected with respect to the ETL file, the human resources database, the data catalog file, or the organizational file. In other words, the knowledge database construction and update unit reflects the updates made to the human resources database, the data catalog file, or the organizational file with respect to the overall knowledge graph.

In this way, the overall knowledge graph is always kept up to date, so it is possible to recommend an ETL workflow based on up-to-date information with respect to a user input.

Next, with reference to FIG. 20, a new ETL workflow creation method according to the embodiments of the present disclosure will be described.

Figure 20:
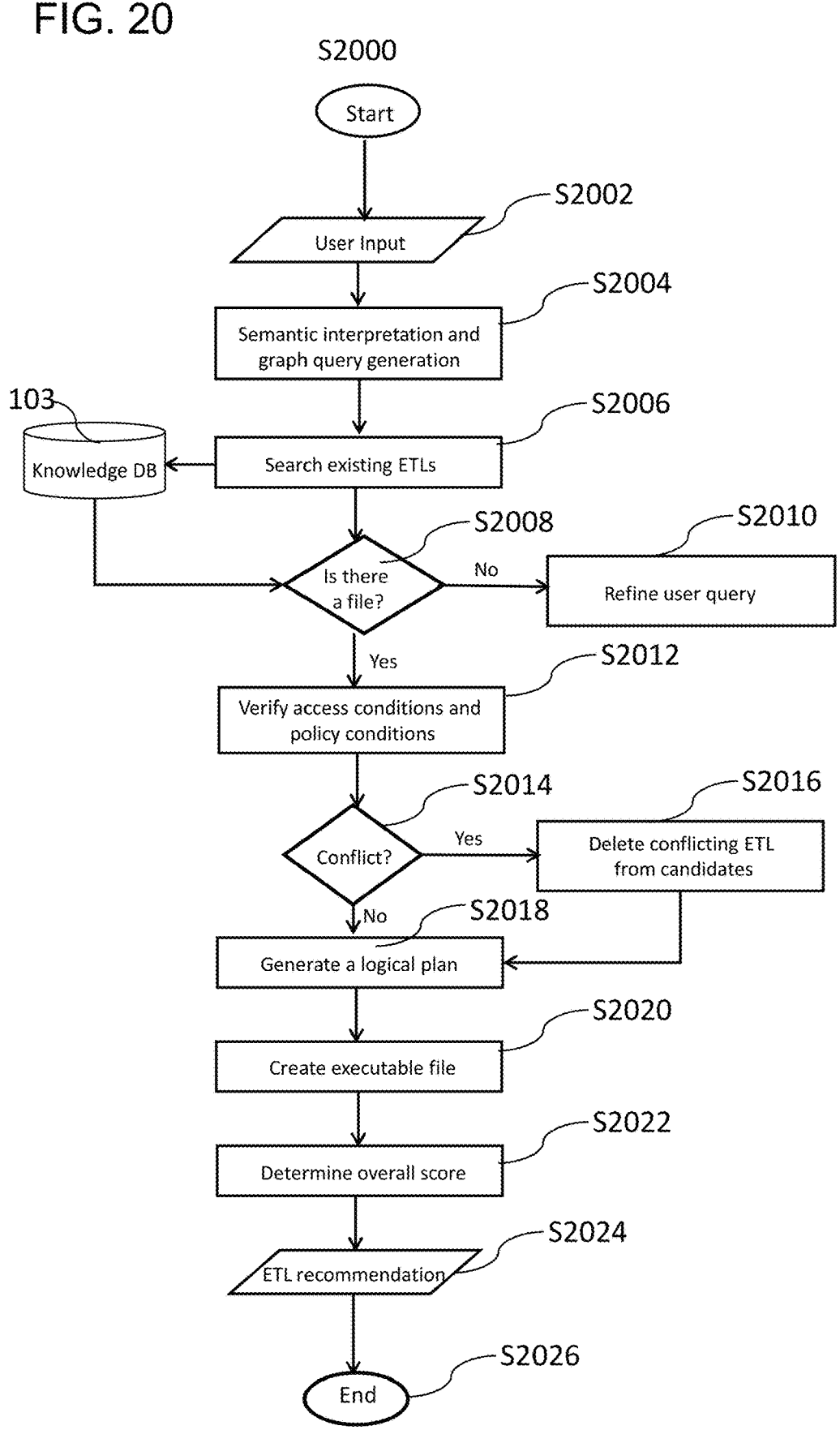
FIG. 20 is a diagram illustrating an example of a new ETL workflow creation method according to the embodiments of the present disclosure.

FIG. 20 is a diagram illustrating an example of a new ETL workflow creation method 2000 according to the embodiments of the present disclosure. The new ETL workflow creation method 2000 illustrated in FIG. 20 is a method for creating a new ETL workflow in the case that there is no existing recommended ETL workflow with respect to a user input, and is executed by the functional units of the ETL workflow recommendation device 100 illustrated in FIG. 1.

It should be noted that the new ETL workflow creation process 2000 method illustrated in FIG. 20 corresponds to Step S1816 illustrated in FIG. 18.

First, in Step S2002, the input management unit of the ETL workflow recommendation device (for example, the input management unit 101 illustrated in FIG. 1) receives a user input from a user. As described above, this user input may include desired ETL workflow goals, business terms, user queries such as "What are the orders and net sales over the past three months?" and/or reference files or the like.

Next, in Step S2004, the ETL recommendation unit of the ETL workflow recommendation device (for example, the ETL recommendation unit 102 illustrated in FIG. 1) executes a semantic interpretation process with respect to the user input received in Step S2002, and then generates a graph query corresponding to the user input.

Next, in Step S2006, the ETL recommendation unit uses the graph query generated in Step S2004 to search the file knowledge graph stored in the knowledge database 103 to determine whether or not there is an existing data catalog file that corresponds to the graph query.

Next, in Step S2008, based on the results of the search in Step S2006, the ETL recommendation unit determines whether or not there is an existing data catalog file that corresponds to the graph query. In the case that there is an existing data catalog file that corresponds to the graph query, the processing proceeds to Step S2012, and in the case that there is no existing data catalog file that corresponds to the graph query, the processing proceeds to Step S2010.

In the case that there is no existing data catalog file that corresponds to the graph query, in Step S2010, the ETL recommendation unit provides the user with a notification to refine the user input received at Step S2002. Subsequently, the user enters a broader user input into the input management unit, and the processing returns to Step S2004.

In the case that there is an existing data catalog file that corresponds to the graph query, in Step S2012, the ETL recommendation unit sets the searched data catalog file as a data catalog file candidate and performs access and policy control with respect to the data catalog file candidates to determine whether or not the data catalog file candidates satisfy the access conditions and the policy conditions.

Here, as an access condition of the data catalog file candidates, the ETL recommendation unit may verify whether or not the user of the ETL workflow recommendation device 100 is authorized to access the searched data catalog files. In addition, as a policy condition of the data catalog file candidates, the ETL recommendation unit may also verify whether or not the searched data catalog files satisfy a predetermined policy (a localization policy, a security policy, or the like).

Next, in Step S2014, in the case that the ETL recommendation unit determines that a searched data catalog file candidate does not satisfy any one of the above-described access conditions and policy conditions, the processing proceeds to Step S2016. On the other hand, in the case that the ETL recommendation unit determines that the searched data catalog file candidates satisfy both the above-described access conditions and the policy conditions, the processing proceeds to Step S2018.

Next, in Step S2018, the ETL recommendation unit generates, as a new ETL workflow candidate, a logical plan formed by concatenating a plurality of processes based on the data catalog file for each data catalog file candidate that was determined to satisfy both the above-described access conditions and policy conditions. For example, here, the ETL recommendation unit may create, as a new ETL workflow candidate, a logical plan based on the processing (input, conversion, output, or the like) specified in the data catalog file, but the means for generating new ETL workflows from the data catalog file are not particularly limited.

Next, in Step S2020, the ETL recommendation unit may generate, for each of the logical plans that comprise the new ETL workflow generated in Step S2018, an executable file (an .exe file or the like) for executing the various processes of the logical plan.

Next, in Step S2022, the ETL recommendation unit calculates an overall score for each of the new ETL workflow candidates generated in Step S2018. As described above, the overall score here is a measure that quantitatively indicates the appropriateness of an ETL workflow candidate with respect to a user input. Here, the ETL recommendation unit may calculate the overall score for each ETL workflow candidate based on the goal, role, and domain correspondence relationship information, the similarity index, ETL characteristics, data quality, performance, cost efficiency, security, usability, applicability, and the like.

Here, the ETL recommendation unit classifies the ETL workflow candidates based on the overall score calculated for each of the ETL workflow candidates. For example, here, the ETL recommendation unit may arrange ETL workflow candidates starting with those that have the highest overall score.

Next, in Step S2024, the output management unit of the ETL workflow recommendation device (for example, the output management unit 104 illustrated in FIG. 1) outputs an ETL workflow report indicating the recommended ETL workflows based on the ETL workflow candidates evaluated and classified in Step S2022. Here, the output management unit may output, for example, the ETL workflow having the highest overall score among the ETL workflow candidates as the recommended ETL workflow, or may output a plurality of ETL workflows that satisfy a predetermined overall score criterion as recommended ETL workflows.

By means of the new ETL workflow creation method 2000 described above, it is possible to generate new ETL workflows even in cases in which there is no existing recommended ETL workflow with respect to a user input, for example.

Next, with reference to FIG. 21, an authentication screen according to the embodiments of the present disclosure will be described.

Figure 21:
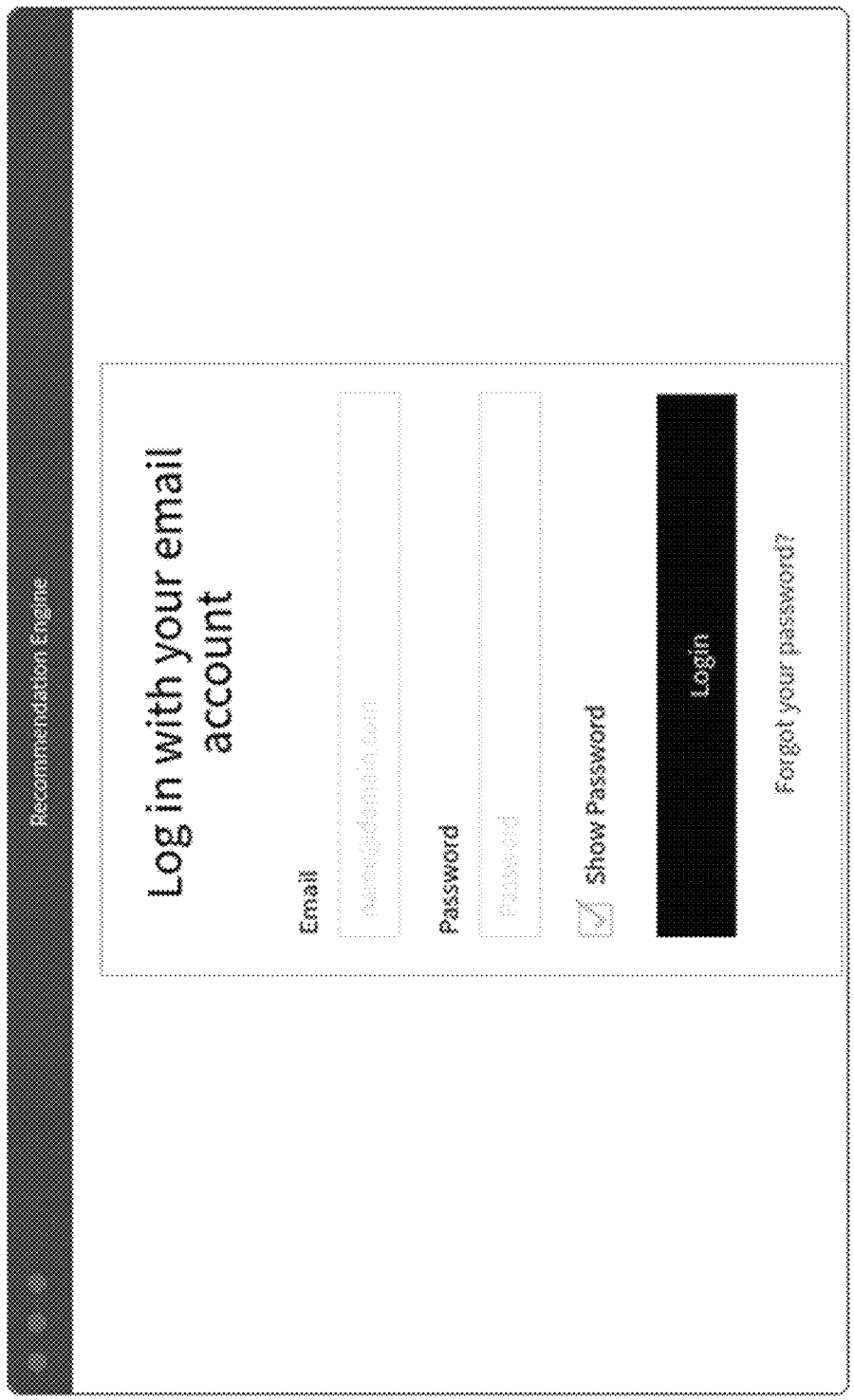
FIG. 21 is a diagram illustrating an example of an authentication screen according to the embodiments of the present disclosure.

FIG. 21 is a diagram illustrating an example of an authentication screen 2100 according to the embodiments of the present disclosure. The authentication screen 2100 is a screen for the user of the ETL workflow recommendation device 100 according to the embodiments of the present disclosure to perform an authentication process. After the user of the ETL workflow recommendation device 100 inputs authentication information such as an email address and a password to the authentication screen 2100, the user authentication unit (for example, the user authentication unit 201 illustrated in FIG. 2) can verify the authentication information and provide access only to registered users.

Next, with reference to FIG. 22, a user input screen according to the embodiments of the present disclosure will be described.

Figure 22:
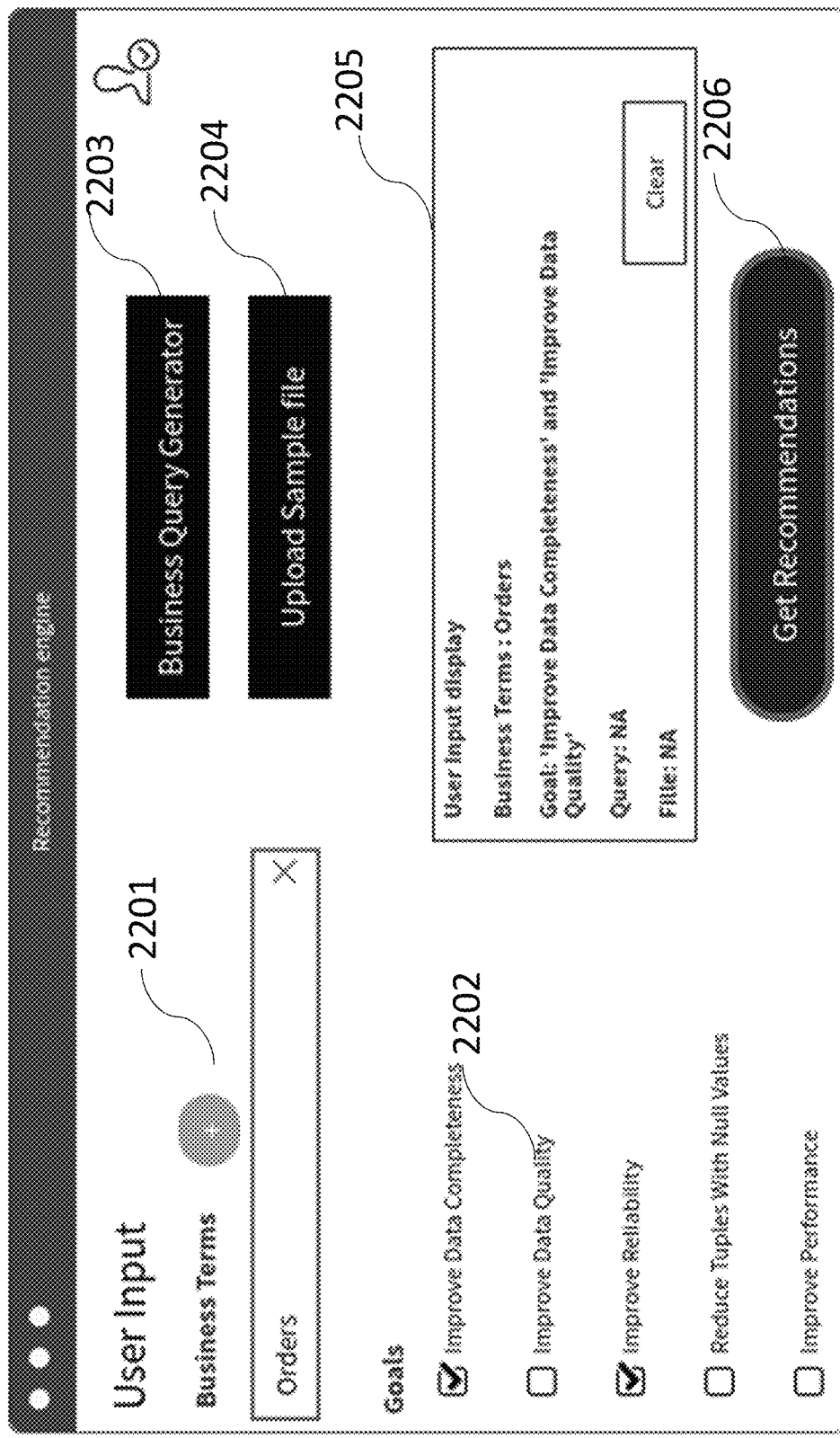
FIG. 22 is a diagram illustrating an example of a user input screen according to the embodiments of the present disclosure.

FIG. 22 is a diagram illustrating an example of a user input screen 2200 according to the embodiments of the present disclosure. The user input screen 2200 is a screen displayed in the case that the authentication information input to the authentication screen 2100 illustrated in FIG. 21 is verified and access to the ETL workflow recommendation device 100 is granted to the user, and is an interface screen for inputting a user input for searching for recommended ETL workflows.

As illustrated in FIG. 22, the user input screen 2200 allows a user to input predetermined business terms 2201, desired ETL workflow goals 2202, user queries 2203, and reference files 2204. In addition, in the user input display 2205, the user can confirm a preview of the information that they entered. Upon completion of the information entry, the user may initiate a search for a recommended ETL workflow by pressing the recommended ETL workflow search button 2206.

Next, with reference to FIG. 23, a user query creation screen 2300 according to the embodiments of the present disclosure will be described.

Figure 23:
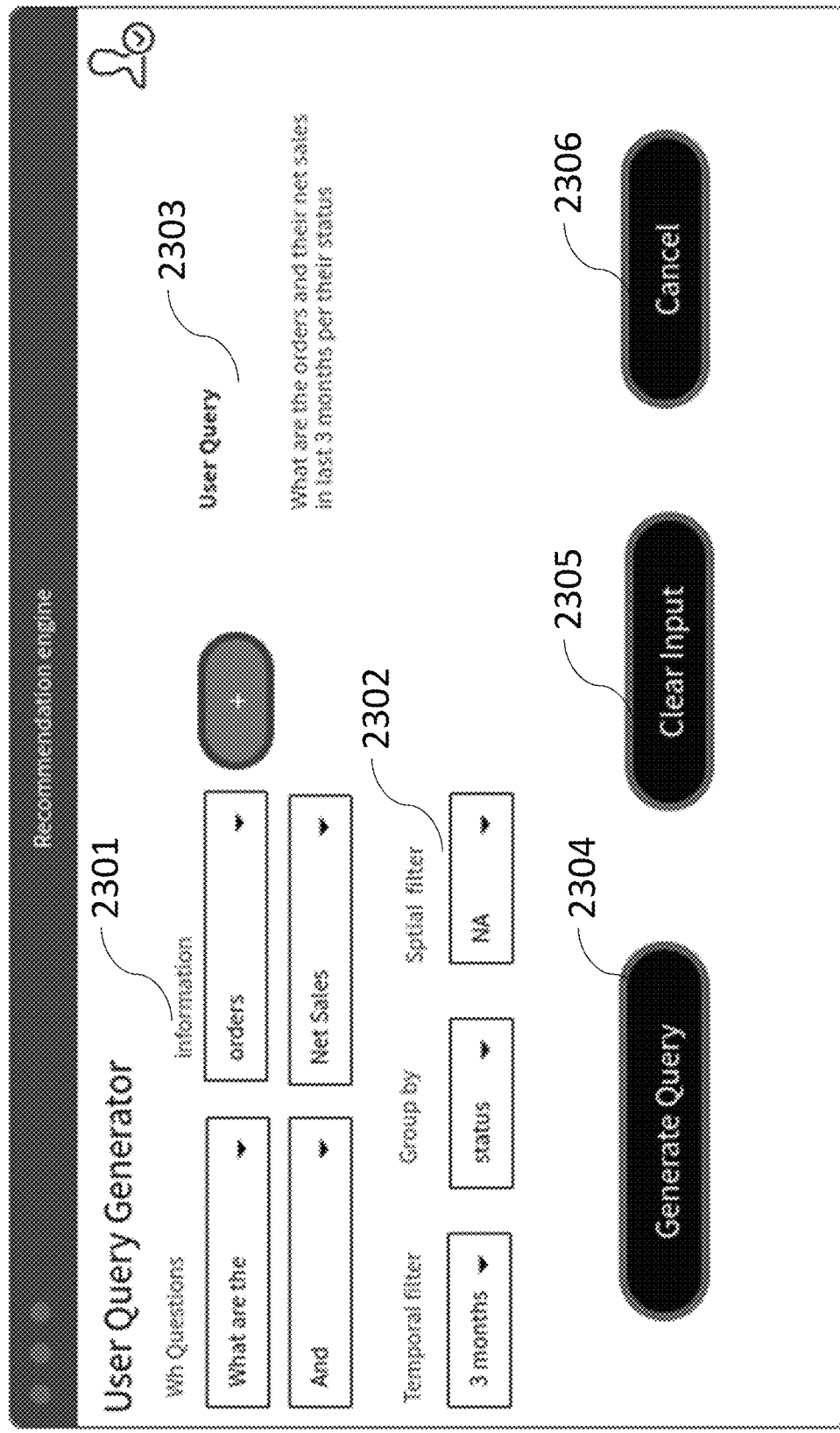
FIG. 23 is a diagram illustrating an example of a user query creation screen according to the embodiments of the present disclosure.

FIG. 23 is a diagram illustrating an example of a user query creation screen 2300 according to the embodiments of the present disclosure. The user query creation screen 2300 is a screen for creating a user query as a user input for searching for recommended ETL workflows.

As illustrated in FIG. 23, the user query creation screen 2300 includes a natural language selection menu 2301, a filter menu 2302, a user query preview 2303, a query creation button 2304, an input reset button 2305, and a return button 2306.

In the natural language selection menu 2301, a user of the ETL workflow recommendation device 100 can create a natural language user query by using a drop-down menu to select candidates of pre-prepared terms.

In addition, in the filter menu 2302, the user of the ETL workflow recommendation device 100 may set a filter for narrowing down the results of the user query using a temporal filter for specifying a predetermined period, a group filter for classifying results into individual groups, a spatial filter for specifying a predetermined location, or the like.

As an example, the user may create a user query of "What are the orders and net sales over the past three months?" by using the natural language selection menu 2301 and the filter menu 2302. User queries created by the user are displayed in real time in the user query preview 2303.

When creation of the user query is completed, the user may return to the user input screen 2200 described above by pressing the query creation button 2304, and then initiate a search for ETL workflows. Alternatively, the user may recreate the user query by pressing the input reset button 2305, or may return to the user input screen 2200 without creating a user query by pressing the return button 2306.

Next, with reference to FIG. 24, a reference file upload screen according to the embodiments of the present disclosure will be described.

Figure 24:
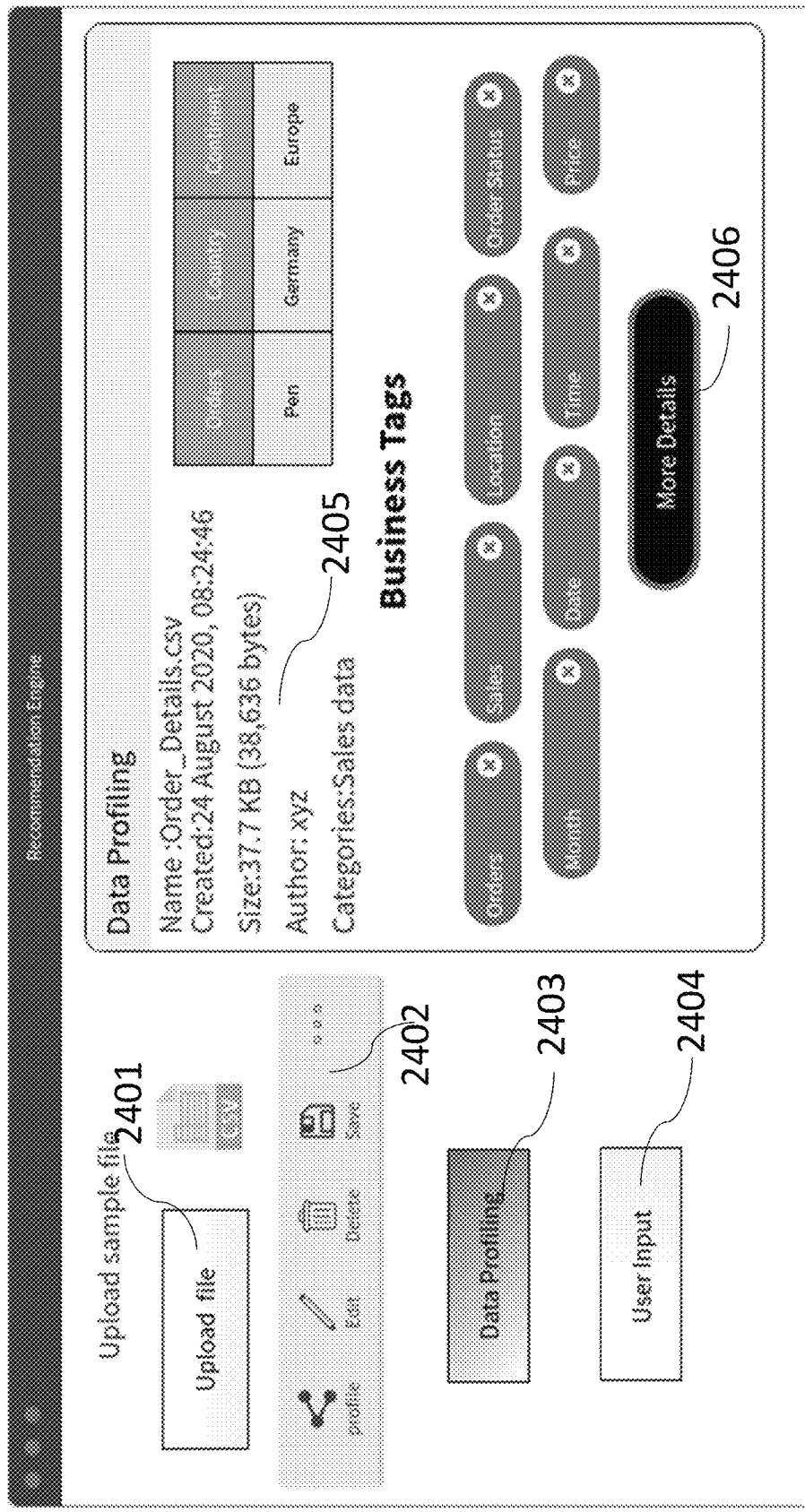
FIG. 24 is a diagram illustrating an example of a reference file upload screen according to the embodiments of the present disclosure.

FIG. 24 is a diagram illustrating an example of a reference file upload screen 2400 according to the embodiments of the present disclosure. The reference file upload screen 2400 is a screen for uploading a reference file as a user input for searching for a recommended ETL workflow.

As illustrated in FIG. 24, the reference file upload screen 2400 includes a file upload button 2401, an editing menu 2402, a data profile acquisition button 2403, a return button 2404, a data profile display 2405, and a detail display button 2406.

Pressing the file upload button 2401 allows a user to upload a reference file to the ETL workflow recommendation device 100. As an example, in the case that a user desires an ETL workflow to aggregate sales information for a particular item in a particular region, the user may upload a reference file configured in the desired data format. In this way, the ETL workflow recommendation device 100 can search for existing files that have high similarity to this reference file and recommend the ETL workflow that was used to output these existing files, thereby providing an ETL workflow that matches the preferences of the user.

The editing menu 2402 allows the user to edit the uploaded reference file. For example, the user may use the editing menu 2402 to save, delete, edit, or confirm the data profile of the uploaded reference file.

By pressing the data profile acquisition button 2403, the ETL workflow recommendation device 100 acquires the data profile for the reference file uploaded by the user. In addition, the data profile acquired here is displayed in the data profile display 2405.

As an example, in the case that a user uploads a reference file of "order_details.csv" and presses the data profile acquisition button 2403, the file name of the reference file, information regarding the creation date and time, information regarding the file size, information regarding the author, a preview of the contents of the file, information regarding the associated business tags and the like are displayed. Further, the user can confirm more detailed information for the reference file by pressing the detail display button 2406.

In addition, the user can return to the user input screen 2200 described above by pressing the return button 2404.

Next, with reference to FIG. 25, a recommended ETL workflow screen according to the embodiments of the present disclosure will be described.

Figure 25:
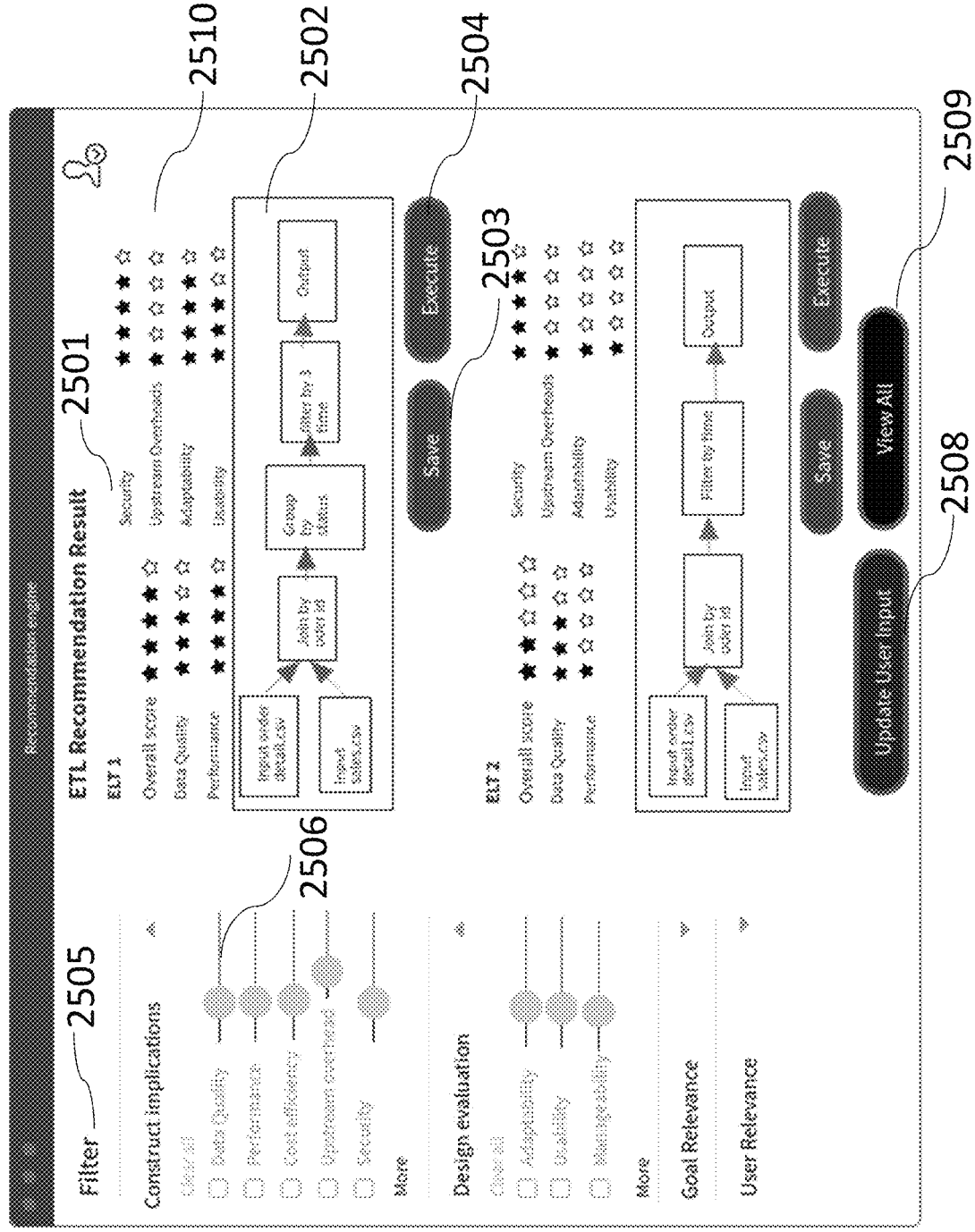
FIG. 25 is a diagram illustrating an example of a recommended ETL workflow screen according to the embodiments of the present disclosure.

FIG. 25 is a diagram illustrating an example of a recommended ETL workflow screen 2500 according to the embodiments of the present disclosure. FIG. 25 is a screen for illustrating an ETL workflow report that is the output of the ETL workflow recommendation method performed by the ETL workflow recommendation device 100.

As illustrated in FIG. 25, the recommended ETL workflow screen 2500 includes a recommended ETL workflow 2501, evaluation information 2510 for the recommended ETL workflow 2501, a flow display 2502 for the recommended ETL workflow 2501, a save button 2503, an execute button 2504, a KPI parameter filter 2505, a parameter weight update menu 2506, a parameter update button 2508, and a view all button 2509.

It should be noted that, for convenience of description, the recommended ETL workflow screen 2500 illustrated in FIG. 25 illustrates a case in which only two recommended ETL workflows are shown as an example, but the present disclosure is not limited thereto, and one, or three or more recommended ETLs may be displayed in the recommended ETL workflow screen 2500.

The recommended ETL workflow 2501 is a recommended ETL workflow searched for with respect to the user input entered in the user input screen 2200 described above. The evaluation information 2510 for the recommended ETL workflow 2501 displays an evaluation regarding each item of the recommended ETL workflow 2501, including overall score, data quality, performance, security, and the like. In addition, in the flow display 2502, each step comprising the recommended ETL workflow 2501 is displayed.

The user may save the recommended ETL workflow 2501 by pressing the save button 2503. In addition, the user may also press the execute button 2504 to execute the recommended ETL workflow 2501 on the spot.

The KPI parameter filter 2505 allows the user to select KPI parameters to narrow down the recommended ETL workflow candidates being displayed. For example, the user can use the parameter weight update menu 2506 to set a desired weight for each of the KPI parameters, such as data quality, performance, cost efficiency, security, and goal relevance. In this way, the user can narrow down the recommended ETL workflow candidates and implement ETL workflow searches in which specific KPI parameters are emphasized.

In the case that the user changes the weight of the KPI parameters using the parameter weight update menu 2506, the KPI parameters used in searching for ETL workflows can be updated by pressing the parameter update button 2508.

In addition, by pressing the view all button 2509, the user can view all the recommended ETL workflow candidates in addition to the recommended ETL workflows currently displayed on the recommended ETL workflow screen 2500.

Figure 26:
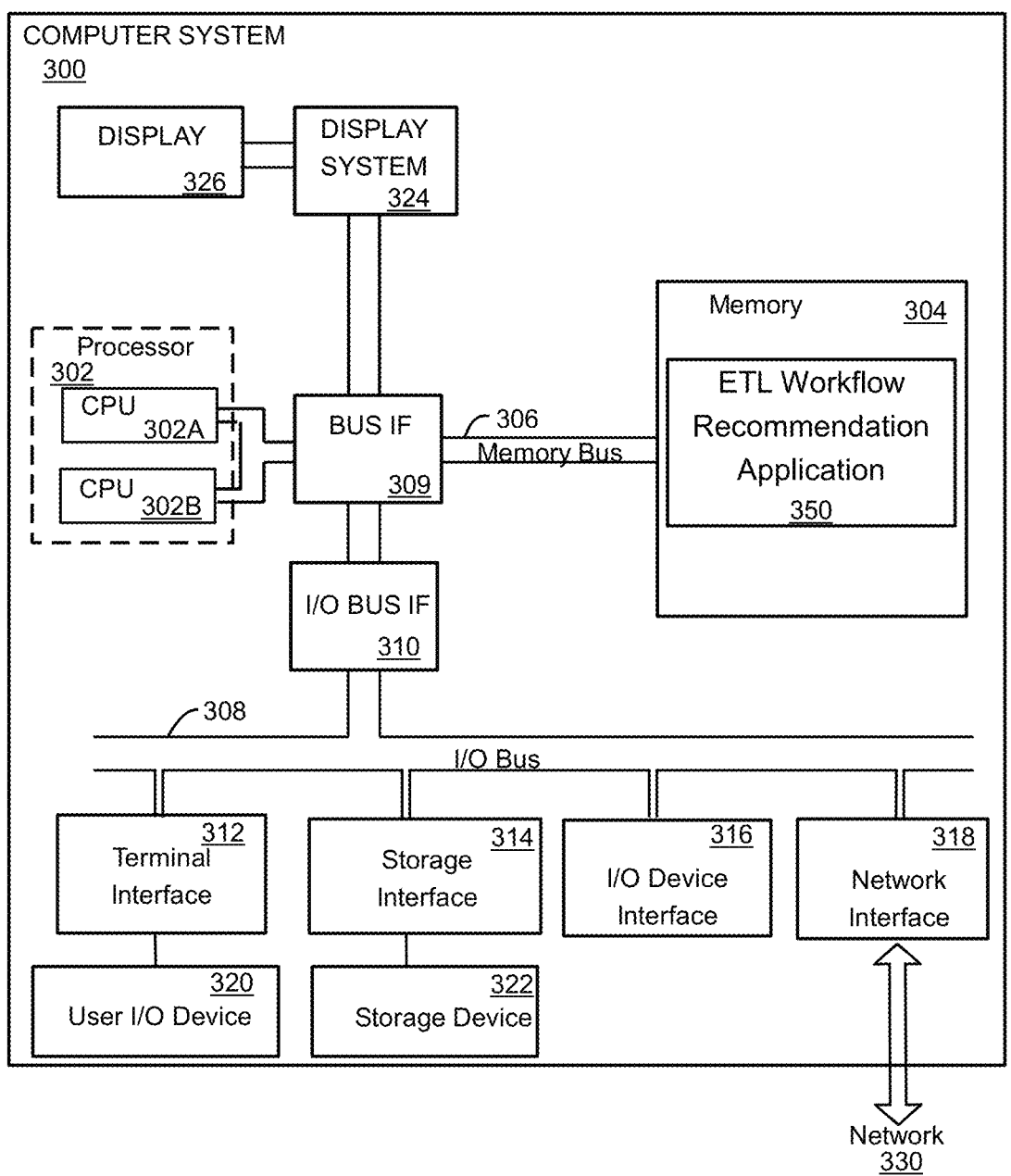
FIG. 26 is a diagram illustrating a computer system for implementing the embodiments of the present disclosure.

Referring now to FIG. 26, a computer system 300 for implementing the embodiments of the present disclosure will be described. The mechanisms and devices of the various embodiments disclosed herein may be applied to any suitable computing system. The main components of the computer system 300 include one or more processors 302, a memory 304, a terminal interface 312, a storage interface 314, an I/O (Input/Output) device interface 316, and a network interface 318. These components may be interconnected via a memory bus 306, an I/O bus 308, a bus interface unit 309, and an I/O bus interface unit 310.

The computer system 300 may include one or more general purpose programmable central processing units (CPUs), 302A and 302B, herein collectively referred to as the processor 302. In some embodiments, the computer system 300 may contain multiple processors, and in other embodiments, the computer system 300 may be a single CPU system. Each processor 302 executes instructions stored in the memory 304 and may include an on-board cache.

In some embodiments, the memory 304 may include a random access semiconductor memory, storage device, or storage medium (either volatile or non-volatile) for storing data and programs. The memory 304 may store all or a part of the programs, modules, and data structures that perform the functions described herein. For example, the memory 304 may store an ETL workflow recommendation application 350. In some embodiments, the ETL workflow recommendation application 350 may include instructions or statements that execute the functions described below on the processor 302.

In some embodiments, the ETL workflow recommendation application 350 may be implemented in hardware via semiconductor devices, chips, logic gates, circuits, circuit cards, and/or other physical hardware devices in lieu of, or in addition to processor-based systems. In some embodiments, the ETL workflow recommendation application 350 may include data other than instructions or statements. In some embodiments, a camera, sensor, or other data input device (not shown) may be provided to communicate directly with the bus interface unit 309, the processor 302, or other hardware of the computer system 300.

The computer system 300 may include a bus interface unit 309 for communicating between the processor 302, the memory 304, a display system 324, and the I/O bus interface unit 310. The I/O bus interface unit 310 may be coupled with the I/O bus 308 for transferring data to and from the various I/O units. The I/O bus interface unit 310 may communicate with a plurality of I/O interface units 312, 314, 316, and 318, also known as I/O processors (IOPs) or I/O adapters (IOAs), via the I/O bus 308.

The display system 324 may include a display controller, a display memory, or both. The display controller may provide video, audio, or both types of data to the display device 326. Further, the computer system 300 may also include a device, such as one or more sensors, configured to collect data and provide the data to the processor 302.

For example, the computer system 300 may include biometric sensors that collect heart rate data, stress level data, and the like, environmental sensors that collect humidity data, temperature data, pressure data, and the like, and motion sensors that collect acceleration data, movement data, and the like. Other types of sensors may be used. The display system 324 may be connected to a display device 326, such as a single display screen, television, tablet, or portable device.

The I/O interface unit is capable of communicating with a variety of storage and I/O devices. For example, the terminal interface unit 312 supports the attachment of a user I/O device 320, which may include user output devices such as a video display device, a speaker, a television or the like, and user input devices such as a keyboard, mouse, keypad, touchpad, trackball, buttons, light pens, or other pointing devices or the like. A user may use the user interface to operate the user input device to input input data and instructions to the user I/O device 320 and the computer system 300 and receive output data from the computer system 300. The user interface may be presented via the user I/O device 320, such as displayed on a display device, played via a speaker, or printed via a printer.

The storage interface 314 supports the attachment of one or more disk drives or direct access storage devices 322 (which are typically magnetic disk drive storage devices, but may be arrays of disk drives or other storage devices configured to appear as a single disk drive). In some embodiments, the storage device 322 may be implemented as any secondary storage device. The contents of the memory 304 are stored in the storage device 322 and may be read from the storage device 322 as needed. The I/O device interface 316 may provide an interface to other I/O devices such as printers, fax machines, and the like. The network interface 318 may provide a communication path so that computer system 300 and other devices can communicate with each other. The communication path may be, for example, the network 330.

In some embodiments, the computer system 300 may be a multi-user mainframe computer system, a single user system, or a server computer or the like that has no direct user interface and receives requests from other computer systems (clients). In other embodiments, the computer system 300 may be a desktop computer, a portable computer, a notebook computer, a tablet computer, a pocket computer, a telephone, a smart phone, or any other suitable electronic device.

While embodiments of the present invention have been described above, the present invention is not limited to the above-described embodiments, and various changes can be made without departing from the spirit of the present invention.

REFERENCE SIGNS LIST

100 ETL workflow recommendation device
101 Input management unit
102 ETL recommendation unit
103 Knowledge DB
104 Output management unit
201 User authentication unit
202 User input display unit
203 Extraction unit
204 Goal extraction unit
205 Business term extraction unit
206 User query generation unit
207 Query display unit
208 Filter unit
209 Business term search unit
210 Reference file upload unit
211 Data profile unit
212 File management unit
361 User input classification unit
362 Semantic interpretation unit
363 File similarity management unit
364 Graph query conversion unit
365 ETL search unit
366 Access and policy control unit
367 Access verification unit
368 Policy verification unit
369 Result refinement unit
370 Policy update unit
371 ETL generation unit
372 Semantic interpretation unit
373 Query generation unit
374 Logical plan generation unit
375 File search unit
376 Executable file generation unit
377 Characteristics estimation unit
378 Access and policy control unit
379 Overall score generation unit
380 Goal, role, and domain correspondence relationship information
381 Similarity index
382 ETL features
383 Knowledge database construction and update unit
384 ETL results classification unit
385 Graph query refinement unit
401 ETL file
402 Human resources database
403 Data catalog file
404 Organizational file
405 ETL information management unit
406 Human resources information management unit
407 File information management unit
408 Organizational information management unit
409 ETL knowledge graph
410 Human resources knowledge graph
411 File knowledge graph
412 Organizational knowledge graph
413 Knowledge aggregation unit
450 Overall knowledge graph
501 Display unit
502 Filter display unit
503 Score display unit
504 ETL script visualization unit
505 Parameter update unit
506 Storage management unit
508 Score update unit

What is claimed is:

1. An Extract, Transform, Load (ETL) workflow recommendation device comprising:
   a knowledge database for storing an overall knowledge graph including an ETL knowledge graph that at least indicates ETL information about a predetermined business domain in a graph format;
   a processor coupled to memory that stores instructions that when executed by the processor configure the processor to:
   receive a user input related to the predetermined business domain and convert the user input into a graph query for searching the overall knowledge graph;
   search the overall knowledge graph using the graph query and generates ETL workflow candidates with respect to the user input; and
   evaluate the ETL workflow candidates based on an overall score as a measure that quantitatively indicates the appropriateness of the ETL workflow with respect to the user input and output an ETL workflow report indicating a recommended ETL workflow having a highest overall score among the ETL workflow candidates as the recommended ETL workflow or a plurality of ETL workflows that satisfy a predetermined overall score criterion as recommended ETL workflows,
   wherein the knowledge database stores, in addition to the ETL knowledge graph, a human resources knowledge graph that indicates, in a graph format, human resources information at least including identification information, role information, work location information, department information, and field-of-expertise information regarding a predetermined human resource,
   wherein the knowledge database stores, in addition to the ETL knowledge graph, an organizational knowledge graph that indicates, in a graph format, organizational information at least including definitions of terms used in a predetermined organization in the business domain,
   wherein the knowledge database stores, in addition to the ETL knowledge graph, a file knowledge graph that indicates, in a graph format, file information at least including information about a predetermined transaction in the business domain, and
   wherein the processor is further configured to generate the overall knowledge graph by aggregating the ETL knowledge graph, the human resources knowledge graph, the organizational knowledge graph, and the file knowledge graph.

2. The ETL workflow recommendation device according to claim 1, wherein the processor is further configured to:
   determine whether or not the ETL workflow candidates satisfy a predetermined access condition and a policy condition; and
   delete an ETL workflow that does not satisfy either the access condition or the policy condition from the ETL workflow candidates.

3. The ETL workflow recommendation device according to claim 1, wherein the processor is further configured to:
   detect an update operation to add, delete, or modify data with respect to the human resource information, the ETL information, the file information, or the organizational information; and
   update the overall knowledge graph based on the update operation.

4. The ETL workflow recommendation device according to claim 1, wherein:
   the user input includes at least one of a user query composed of natural language, a predetermined business term, a desired ETL workflow goal, or a reference file.

5. The ETL workflow recommendation device according to claim 1, wherein the processor is further configured to:
   generate, in a case that an existing ETL workflow that achieves a predetermined similarity criterion with respect to the graph query exists in the overall knowledge graph, the existing ETL workflow as an ETL workflow candidate; and
   extract, in a case that an existing ETL workflow that achieves a predetermined similarity criterion with respect to the graph query does not exist in the overall knowledge graph, a data file that achieves a predetermined relevance criterion with respect to the graph query from the overall knowledge graph, and
   generate, based on the extracted data file, a logical plan that concatenates multiple processes as a new ETL workflow candidate.

6. An ETL workflow recommendation method comprising:
   generating an overall knowledge graph by aggregating an ETL knowledge graph that indicates ETL information about a predetermined business domain in a graph format, a human resources knowledge graph that indicates, in a graph format, human resources information at least including identification information, role information, work location information, department information, and field-of-expertise information regarding a predetermined human resource, an organizational knowledge graph that indicates, in a graph format, organizational information at least including definitions of terms used in a predetermined organization in the business domain, and a file knowledge graph that indicates, in a graph format, file information at least including information about a predetermined transaction in the business domain;
   receiving a user input related to the predetermined business domain and converting the user input into a graph query for searching the overall knowledge graph;
   searching the overall knowledge graph using the graph query and determining whether or not an ETL workflow with respect to the user input exists;
   generating, in a case that an existing ETL workflow that achieves a predetermined similarity criterion with respect to the graph query exists in the overall knowledge graph, the existing ETL workflow as an ETL workflow candidate; extracting a data file that achieves a predetermined relevance criterion with respect to the graph query from the overall knowledge graph, and generating, based on the extracted data file, a logical plan that concatenates multiple processes as a new ETL workflow candidate;
   determining whether or not the ETL workflow candidates satisfy a predetermined access condition and a policy condition;
   deleting an ETL workflow that does not satisfy either the access condition or the policy condition from the ETL workflow candidates; and
   evaluating the ETL workflow candidates and outputting an ETL workflow report indicating a recommended ETL workflow.

7. The ETL workflow recommendation method according to claim 6, further comprising:
- detects an update operation to add, delete, or modify data with respect to the human resource information, the ETL information, the file information, or the organizational information; and
- updating the overall knowledge graph based on the update operation.

8. An ETL workflow recommendation system comprising:
- a storage device for storing various information used in providing the ETL workflow recommendation, and a user terminal that is a terminal of a user that uses the ETL workflow recommendation, the storage device and the user terminal being connected via a communication network;
- the storage device including a knowledge database for storing an overall knowledge graph including an ETL knowledge graph that at least indicates ETL information about a predetermined business domain in a graph format, and
- a processor coupled to memory that stores instructions that when executed by the processor configure the processor to:
- receive a user input related to the predetermined business domain and convert the user input into a graph query for searching the overall knowledge graph, an ETL recommendation unit that searches the overall knowledge graph using the graph query and generates ETL workflow candidates with respect to the user input, and
- evaluate the ETL workflow candidates based on an overall score as a measure that quantitatively indicates the appropriateness of the ETL workflow with respect to the user input and output an ETL workflow report indicating a recommended ETL workflow having a highest overall score among the ETL workflow candidates as the recommended ETL workflow or a plurality of ETL workflows that satisfy a predetermined overall score criterion as recommended ETL workflows to the user terminal,
- wherein the knowledge database stores, in addition to the ETL knowledge graph, a human resources knowledge graph that indicates, in a graph format, human resources information at least including identification information, role information, work location information, department information, and field-of-expertise information regarding a predetermined human resource,
- wherein the knowledge database stores, in addition to the ETL knowledge graph, an organizational knowledge graph that indicates, in a graph format, organizational information at least including definitions of terms used in a predetermined organization in the business domain,
- wherein the knowledge database stores, in addition to the ETL knowledge graph, a file knowledge graph that indicates, in a graph format, file information at least including information about a predetermined transaction in the business domain, and
- wherein the processor is further configured to generate the overall knowledge graph by aggregating the ETL knowledge graph, the human resources knowledge graph, the organizational knowledge graph, and the file knowledge graph.

* * * * *